United States Patent
Cao

(10) Patent No.: US 9,508,171 B2
(45) Date of Patent: Nov. 29, 2016

(54) PATH TRACING METHOD

(71) Applicant: CANON KABUSHIKI KAISHA, Tokyo (JP)

(72) Inventor: Cuong Hung Cao, Revesby (AU)

(73) Assignee: CANON KABUSHIKI KAISHA, Tokyo (JP)

(*) Notice: Subject to any disclaimer, the term of this patent is extended or adjusted under 35 U.S.C. 154(b) by 87 days.

(21) Appl. No.: 14/088,063

(22) Filed: Nov. 22, 2013

(65) Prior Publication Data
US 2014/0146081 A1 May 29, 2014

(30) Foreign Application Priority Data

Nov. 27, 2012 (AU) .................. 2012258408

(51) Int. Cl.
| | |
|---|---|
| G06T 11/20 | (2006.01) |
| G06T 11/60 | (2006.01) |
| G06F 3/12 | (2006.01) |
| G06K 15/02 | (2006.01) |
| G06T 11/40 | (2006.01) |

(52) U.S. Cl.
CPC ............. G06T 11/60 (2013.01); G06T 11/203 (2013.01); *G06F 3/1215* (2013.01); *G06F 3/1245* (2013.01); *G06F 3/1248* (2013.01); *G06K 15/181* (2013.01); *G06K 15/1836* (2013.01); *G06K 15/1849* (2013.01); *G06T 11/20* (2013.01); *G06T 11/40* (2013.01)

(58) Field of Classification Search
CPC ...... G06T 11/203; G06T 11/40; G06T 11/20; G06K 15/181; G06K 15/1836; G06K 15/1849; G06F 3/1248; G06F 3/1215; G06F 3/1245

USPC ................ 345/440, 619, 629, 441, 467, 636
See application file for complete search history.

(56) References Cited

U.S. PATENT DOCUMENTS

| | | | |
|---|---|---|---|
| 6,173,075 B1 | 1/2001 | Collins | |
| 6,560,361 B1 | 5/2003 | Collins | |
| 2006/0066621 A1* | 3/2006 | Herceg et al. ................ | 345/501 |
| 2007/0206012 A1* | 9/2007 | Combes et al. ............... | 345/441 |
| 2008/0144952 A1* | 6/2008 | Chen et al. ................... | 382/239 |
| 2009/0295828 A1* | 12/2009 | Koziarz et al. ............... | 345/619 |
| 2011/0069326 A1* | 3/2011 | Oishi ............................ | 358/1.2 |
| 2011/0299105 A1* | 12/2011 | Morrison et al. ............. | 358/1.9 |
| 2013/0129225 A1* | 5/2013 | Poyil et al. ................... | 382/199 |

FOREIGN PATENT DOCUMENTS

| | | |
|---|---|---|
| AU | 2001097408 B2 | 7/2002 |
| AU | 2002301567 B2 | 6/2003 |

* cited by examiner

Primary Examiner — Jin-Cheng Wang
(74) Attorney, Agent, or Firm — Canon USA, Inc. IP Division

(57) ABSTRACT

Disclosed is a method of rendering at least one graphical object comprising a plurality of sub parts described with a page description language format, said method comprising the steps of: converting the at least one graphical object into a first edge pair and a second edge pair, wherein the first edge pair and the second edge pair are vertically separated by a scanline gap; joining the second edge pair and the first edge pair to make a corresponding new edge pair having an empty fill portion in the scanline gap; and processing the new edge pair to render the at least one graphical object.

16 Claims, 17 Drawing Sheets

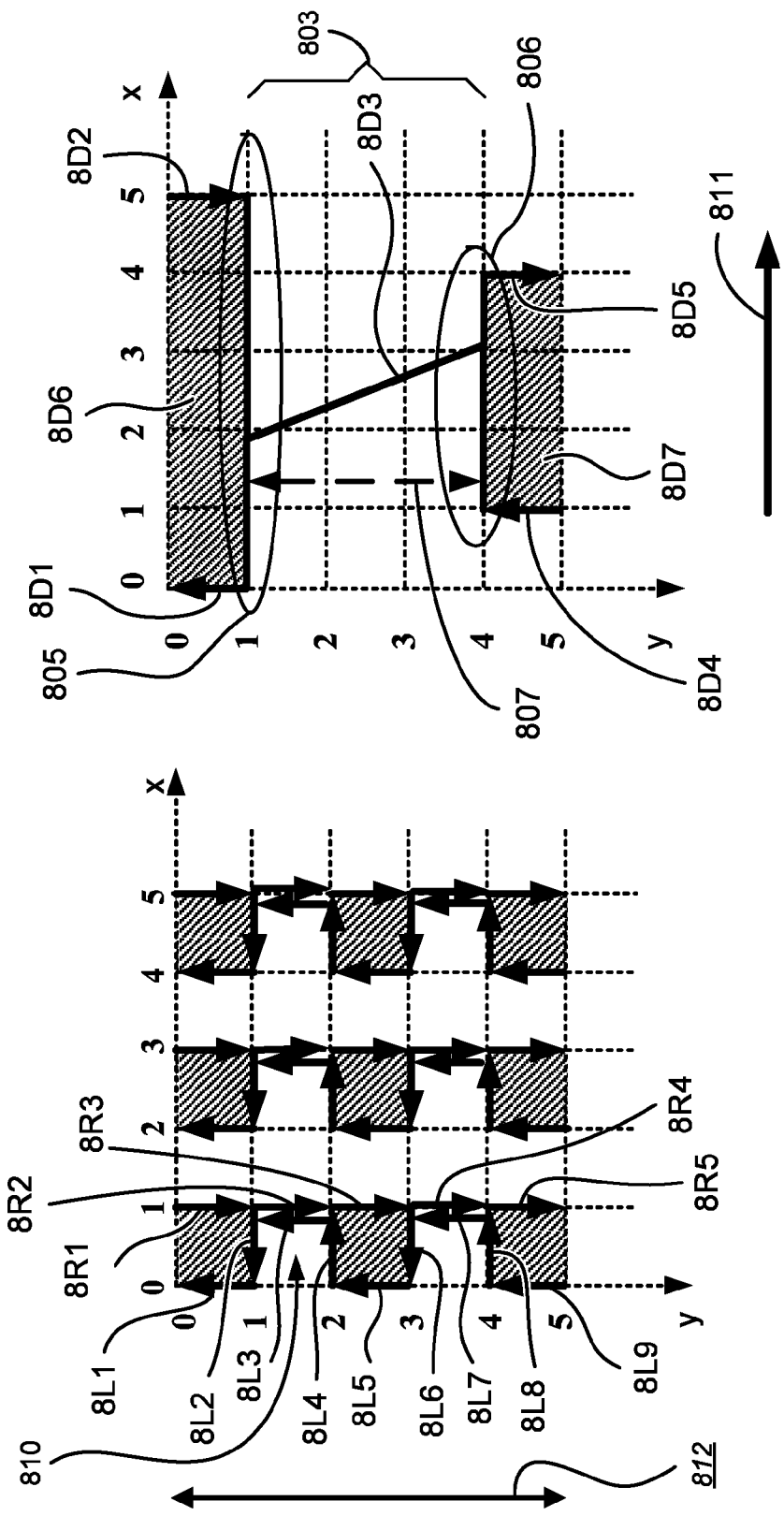

```
struct TraceEdge
{
    TraceEdge * Next;
    TraceEdge * Prev;

TraceEdge * JoinStart;
    TraceEdge *JoinEnd;

Boolean IsLeft;
    Int StartX;
    Int StartY;
    Int EndX;
    Int EndY;

Void *SegData;
    Int SegCount;
};
```

PATH TRACING METHOD

REFERENCE TO RELATED PATENT APPLICATION(S)

This application claims the benefit under 35 U.S.C. §119 of the filing date of Australian Patent Application No. 2012258408, filed 27 Nov. 2012, hereby incorporated by reference in its entirety as if fully set forth herein.

TECHNICAL FIELD

The current invention relates to graphics processing, and in particular to display list optimisations in the rendering pipeline.

BACKGROUND

Typically a computer application such as 168 in FIG. 1A or an operating system provides a graphic object stream to a device such as a printer 1750 in FIG. 1A for printing and/or display. A graphic object stream is a sequence of graphic objects such as 1801 in FIG. 13 in priority order (also known as z-order). A typical graphic object 1801 comprises a fill path (also referred to simply as a "path" (depicted by a directed dashed line 1802), a fill pattern (depicted by the diagonal line pattern within the fill path 1802), a raster operator ROP, optional clip paths, and other attributes.

A fill path comprises of a plurality of closed paths where each closed path comprises a plurality of x-y coordinate points (also referred to as points) to represent a plurality of curve segments where the endpoint of each curve segment is the starting point of the next curve segment, and the last curve segment's end point is the starting point of the first curve segment. A curve segment can be a linear line segment which is referred as "line segment". The embodiment can be generalized for other non-linear curve segments such as quadratic Bezier curve segment, cubic curve segment, etc. For example the application may provide a graphic object stream via function calls to a Graphics Device Interface (GDI) layer, such as the Microsoft Windows™ GDI layer. A printer driver for the associated target printer is software that receives the graphic object stream from the GDI layer. For each graphic object, the printer driver is responsible for generating a description of the graphic object in the Page Description Language (PDL) that is understood by the rendering system of the target printer.

In some systems the application 168 or operating system may store the print data generated by the application 168 in a file, referred to as a spool file, in a common well-defined format. The common well-defined format is also called the spool file format. During printing the printer driver receives the spool file, and parses the contents of the file to generate graphic object streams for a Raster Image Processor on the target printer. Examples of spool file formats are Adobe's PDF™ and Microsoft's XPS™.

In order to print a spool file residing on a computer on a target printer, the spool file contents must first be converted to the equivalent graphic object stream for the Raster Image Processor (RIP). A filter module, typically residing in a printer driver, is used to achieve this.

Some current raster image processors use the well-known Pixel-Sequential Rendering (PSR) method to generate raster images. In such arrangements a description of all graphic objects to be drawn are retained in a display list. On each scanline such as 1803, edges such as 1805, 1806 of objects such as 1801 that intersect the scanline 1803 at respective scanline coordinates 1807, 1808 are stored, in the form of corresponding edge records, in a list in increasing scanline-axis order of their intersection with the scanline. These points of intersection 1807, 1808, or edge crossings, are considered by an operative processor in turn, and are used to activate or deactivate objects in the display list. Between each pair of edge crossings considered such as 1807, 1808, colour data for each pixel that lies between the first edge crossing 1807 and the second edge crossing 1808 is generated based on which graphic objects are active for that horizontal span of pixels 1809. This horizontal span of pixels is referred to as "a pixel run". The distance 1823 between the scanline coordinates 1807, 1808 in the scanline direction 1822 in parallel to x axis is referred to as the pixel run range of the pixel run 1809, or alternately as the range of the pixel run 1809. In preparation for the next scanline, the coordinates of intersection 1807, 1808 of each respective edge 1805, 1806 is updated in accordance with the nature of each edge. New edges are also merged into the list of edges, which is called the active edge list. Any active edges that have expired (i.e. have become inactive) on the current scanline are removed from the active edge list.

Generally computer applications or operating systems generate optimal graphic objects for displaying or printing. Applications that generate non-optimal graphic objects may cause a RIP to stall or fail to properly render a certain data stream. For example if thousands of glyph graphic objects are to be drawn at approximately the same location, there will be many edges and many object activation and deactivation events that will significantly reduce the overall RIP performance. Typically a RIP cannot handle this kind of graphic object stream properly.

In one known RIP system, many graphic objects of similar characteristics within close proximity are detected and combined into a single composite object. The resulting path of the composite object, referred to as a composite path, is a combination of all the paths representing all the objects that are combined to make up the composite object. The resulting composite path generated by the RIP system represents the boundary of the composite object. However when converting this composite path to a display list format, the composite path can generate many edges, which will typically require a considerable amount of memory and may create a performance problem.

In another known RIP system, complex path objects are detected just before they are added to the display list. An object is considered as having complex path either when the object's path has many points in a small region, or when the object is painted using a special raster operation where the object's mask can be represented as the object outline. Once a complex object path is detected, the known RIP system is used to scan-convert the object's path to produce pixel runs such as 1809. Thereafter, adjacent overlapping pixel runs such as 1809, 1810 are joined together with edges 1811-1809-1805 and 1806-1813-1812 thus defining boundaries of the resultant pixel run. This is known as "path tracing" or "edges tracing" or merely as rendering. Current known "path tracing" methods do not produce the minimum number of edges for a particular input path data.

SUMMARY

It is an object of the present invention to substantially overcome, or at least ameliorate, one or more disadvantages of existing arrangements.

Disclosed are arrangements, referred to as Edge Extension (EE) arrangements, which seek to address the above problems by reducing the number of edges, compared with known methods, when processing an objects' path, by joining vertically disjoint pixel runs together where feasible, and/or breaking a long pixel run in a current scanline into two or more pieces if appropriate so that multiple overlapped pixel runs above and below the current scanline, and one of the pieces of the long pixel run can be joined together.

According to a first aspect of the present disclosure, there is provided a method of rendering at least one graphical object comprising a plurality of sub parts described with a page description language format, said method comprising the steps of: converting the at least one graphical object into a first edge pair and a second edge pair, wherein the first edge pair and the second edge pair are vertically separated by a scanline gap; determining if a first edge of the second edge pair is in a vertical line with a first edge of the first edge pair; determining if a second edge of the second edge pair is displaced from the first edge of the second edge pair in a same scan direction as a second edge of the first edge pair is displaced from the first edge of the first edge pair; if the first edge of the second edge pair is in the vertical line with the first edge of the first edge pair, and the second edge of the second edge pair is displaced from the first edge of the second edge pair in the same scan direction as the second edge of the first edge pair is displaced from the first edge of the first edge pair, joining the second edge pair and the first edge pair to make a corresponding new edge pair having an empty fill portion in the scanline gap; and processing the new edge pair to render the at least one graphical object.

According to a second aspect of the present disclosure, there is provided a method of rendering at least one graphical object comprising a plurality of sub parts described with a page description language format, said method comprising the steps of: converting the at least one graphical object into a first edge pair and a second edge pair, wherein the first edge pair and the second edge pair are vertically separated by a scanline gap; joining the second edge pair and the first edge pair to make a corresponding new edge pair having an empty fill portion in the scanline gap; and processing the new edge pair to render the at least one graphical object.

According to another aspect of the present disclosure, there is provided method of rendering at least one graphical object described with a page description language, said method comprising the steps of: converting the at least one graphical object described with a page description language format into a set of edges; detecting a plurality of pixel runs on a previous scanline and a plurality of pixel runs on a subsequent scan line, in a range of a pixel run on a current scanline; and splitting the pixel run on the current scanline into a plurality of portions corresponding to the plurality of pixel runs on the previous scanline and the plurality of pixel runs the subsequent scanline: forming closed paths each of which comprises a portion of the pixel run on the current scanline, one of the plurality of pixel runs of the previous scanline, and one of the plurality of pixel runs of the subsequent scanline, wherein the one of the plurality of pixel runs on the previous scanline, and one of the plurality of pixel runs on the subsequent scanline are adjacent to the portion of the pixel run on the current scanline; and processing edges of the formed closed path to render the at least one graphical object.

According to another aspect of the present disclosure, there is provided an apparatus for implementing any one of the aforementioned methods.

According to another aspect of the present disclosure there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and at least one embodiment of the present invention will now be described with reference to the drawings, in which:

FIG. 8C is a diagram illustrating a EE arrangement result from the pattern of FIG. 8A;

FIG. 8D is a diagram illustrating an example of 2 edges with a coincident line segment;

DETAILED DESCRIPTION INCLUDING BEST MODE

Figure 1A:
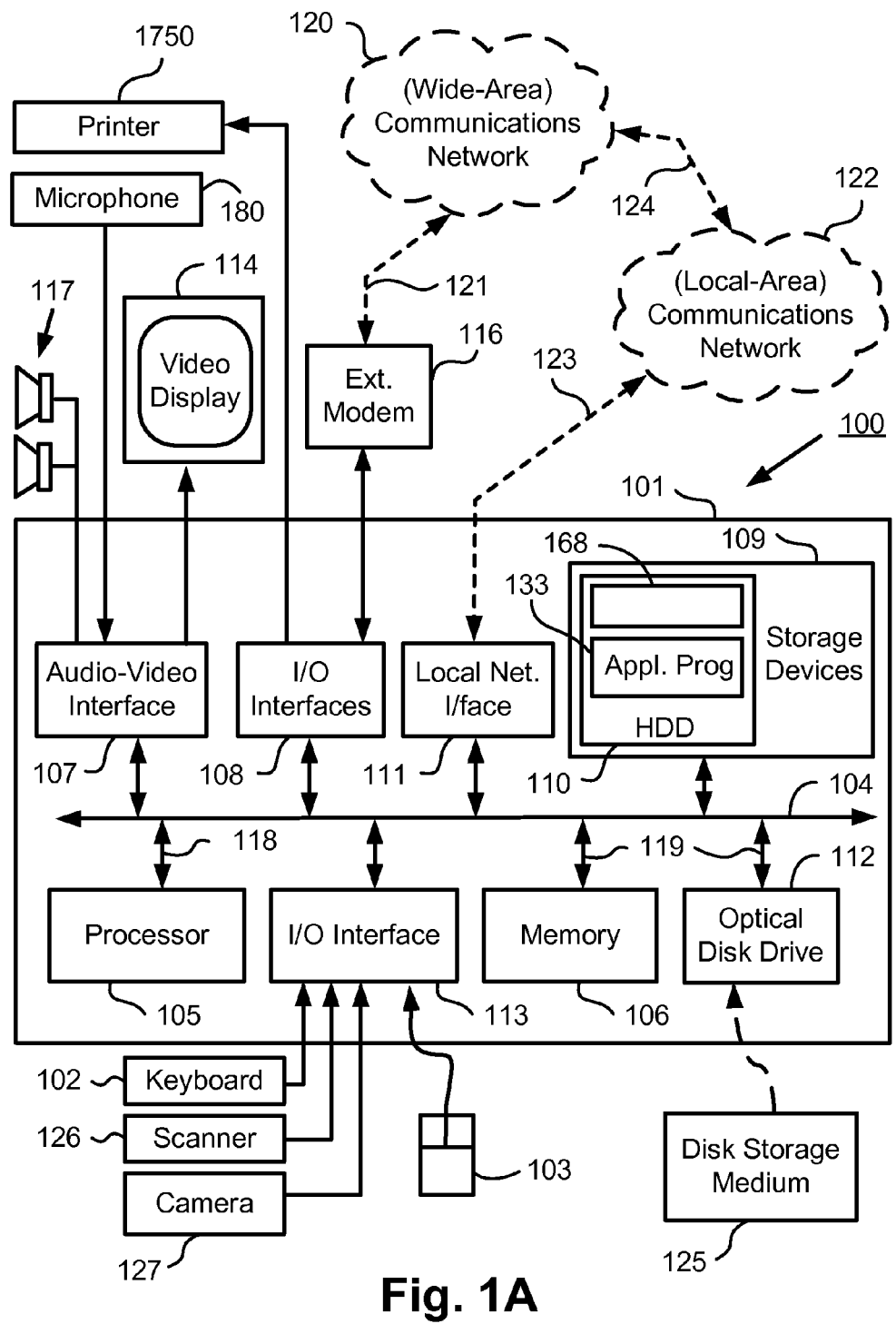
FIGS. 1A and 1B form a schematic block diagram of a general purpose computer system upon which described EE arrangements can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

Figure 1B:
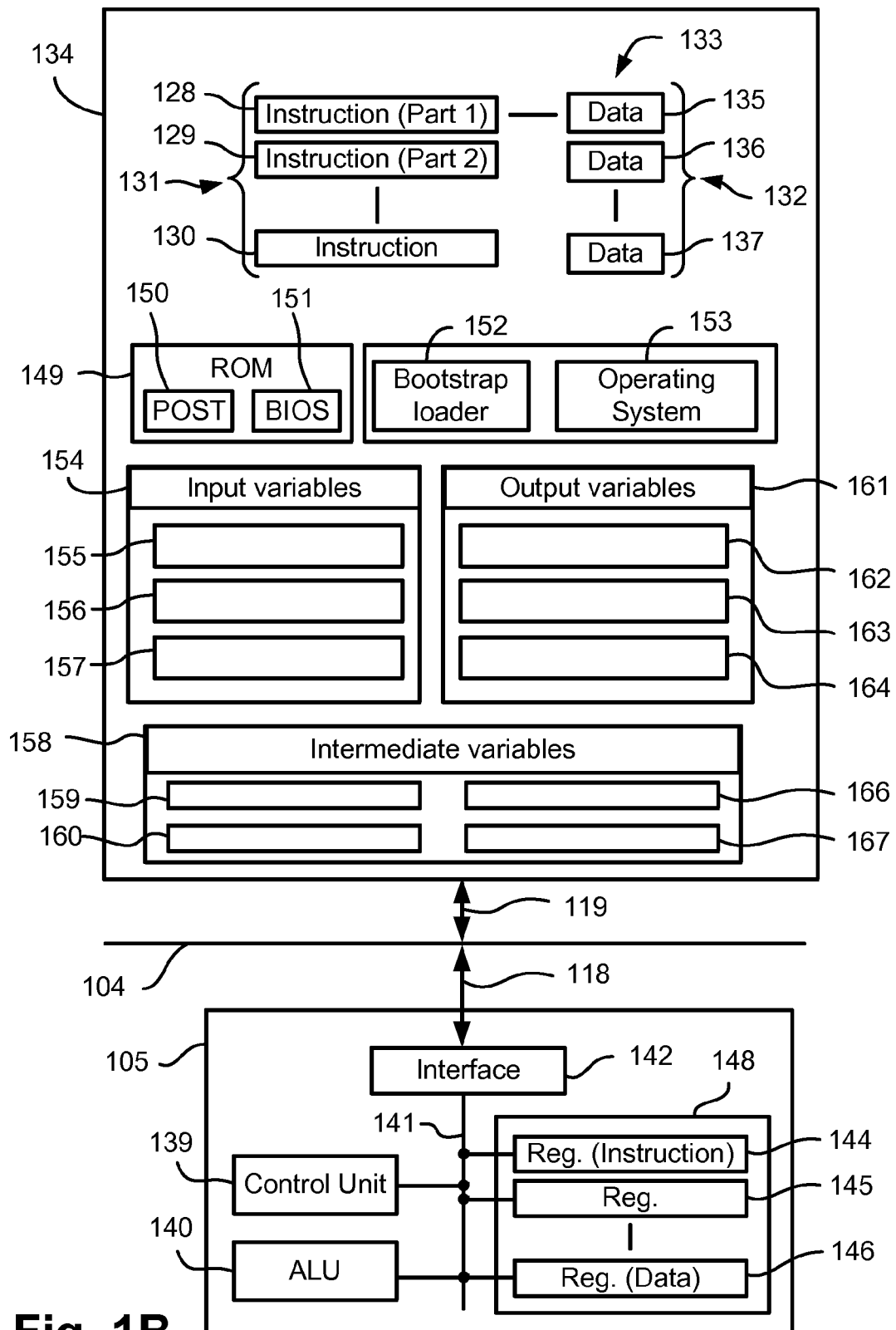

FIGS. 1A and 1B depict a general-purpose computer system 100, upon which the various EE arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including the printer 1750, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printer 1750. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The methods of graphics processing to be described may be implemented using the computer system 100 wherein the processes of FIGS. 3-7, 9-10 and 17, to be described, may be implemented as one or more EE software application programs 133 executable within the computer system 100. As described above other applications such as the application 168, which may for example be a word processor, can also execute on the computer system, generating the document(s) and graphic object(s) (such as 1710 and 1711 respectively in FIG. 12 for example), upon which the described EE arrangements operate. In particular, the EE methods of graphics processing are effected by instructions 131 (see FIG. 1B) in the software 133 that are carried out within the computer system 100. The software instructions 131 may be formed as one or more code modules, each for performing one or more particular tasks. The EE software may also be divided into two separate parts, in which a first part and the corresponding code modules performs the EE graphics processing methods and a second part and the corresponding code modules manage a user interface between the first part and the user.

The EE software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for effecting the EE graphics processing.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for performing the EE graphics processing.

In some instances, the application programs 133 may be supplied to the user encoded on one or more CD-ROMs 125 and read via the corresponding drive 112, or alternatively may be read by the user from the networks 120 or 122. Still further, the EE software can also be loaded into the computer system 100 from other computer readable media. Computer readable storage media refers to any non-transitory storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The EE application program 133 includes a sequence of instructions 131 that may include conditional branch and loop instructions. The EE program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed EE graphics processing arrangements use input variables 154, which are stored in the memory 134 in corresponding memory locations 155, 156, 157. The graphics processing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a. a fetch operation, which fetches or reads an instruction 131 from a memory location 128, 129, 130;
b. a decode operation in which the control unit 139 determines which instruction has been fetched; and
c. an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the EE graphics processing of FIGS. 3-7, 9-10, 17 and 20 and 17 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

Figure 12:
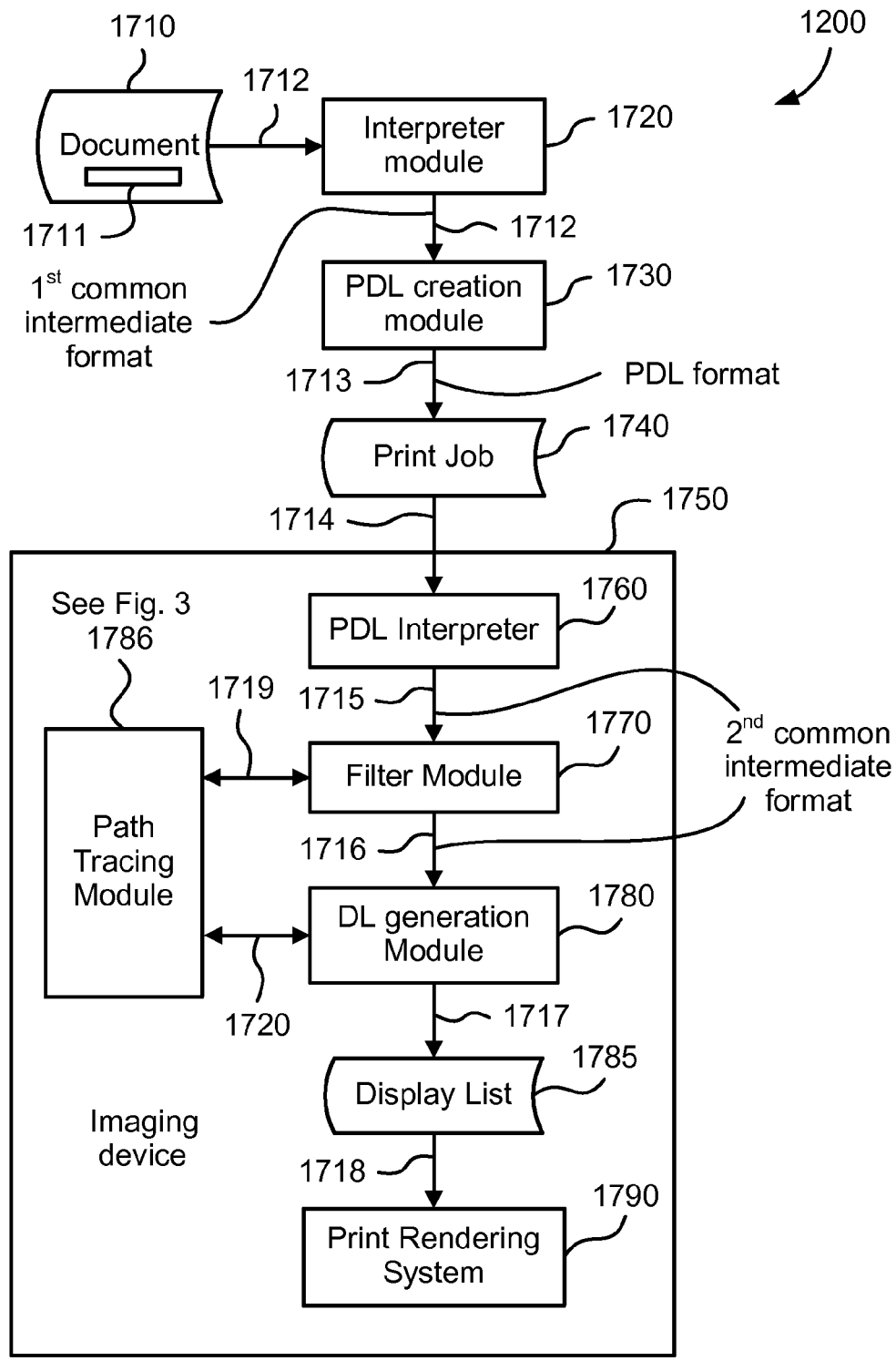
FIG. 12 is a block diagram of the modules of the printing system within which the EE arrangements may be practised.

FIG. 12 is a block diagram of the modules of the printing system within which the EE arrangements may be practised and depicts a schematic representation of a printing system 1700, for example implementable in the system 100 of FIG. 1. An Interpreter module 1720 parses a document 1710 and converts graphic objects 1711, which are stored in the document 1710 and passed to the interpreter module as depicted by an arrow 1712, to a $1^{st}$ common intermediate format. Each object 1711 is passed from the interpreter module 1720, as depicted by an arrow 1712, to a Page Description Language (PDL) creation module 1730. The PDL creation module 1730 converts, as depicted by an arrow 1713, object data to a print job 1740 which is in the PDL format.

The print job 1740 is sent, as depicted by an arrow 1714, to the printer 1750 (also referred to hereinafter as an Imaging device) which contains a PDL interpreter 1760, a Filter module 1770 and a Print Rendering System 1790, so that the printer can generate a pixel-based image of each page at "device resolution". This relates to the fact that the pixel resolution of the object 1711 in the document 1710 may not be the same as the pixel resolution of the printer 1750. Hereinafter, all references to "pixels" refer to device-resolution pixels unless otherwise stated. The PDL interpreter 1760 parses the print job 1740 and converts the objects stored in the print job to a $2^{ND}$ common intermediate format which may be the same as the $1^{st}$ intermediate format. Each object is passed, as depicted by an arrow 1715, to the Filter module 1770. The Filter module 1770 coalesces candidate object data and generates a coalesced object in the $2^{nd}$ common intermediate format, which is passed, as depicted by an arrow 1716, to a Display List Generation module 1780 to generate, as depicted by an arrow 1717, a display list 1785. The coalesced object can be a simplified object that can be rendered by the print rendering system 1790. A coalesced object can also be a composite object that can be rendered by the print rendering system 1790. The display list 1785 is passed, as depicted by an arrow 1718, to a Print Render System 1790 which renders the display list 1785 to a physical medium such as paper, if the document 1710 is to be printed, or to a display on the display device 114, if the document 1710 is to be displayed.

Both the Filter module 1770, and the DL Generation module 1780 utilise a Path Tracing Module 1786, described hereinafter in more detail with reference to FIG. 3, for intermediate path processing as depicted by respective arrows 1719 and 1720. In general-purpose computing environments such as depicted in FIGS. 1A and 1B, the document 1710 is typically generated by the software application 168 executing on the computer module 101, or by another software application (not shown) executing on a remote computer (not shown) communicating with the computer module 101 across the network 120. The modules 1720-1730 are typically implemented in software, which may be part of the EE software application 133 for example, generally executed within the computer module 101.

The Imaging Device 1750 is typically a Laser Beam or Inkjet printer device. The PDL Interpreter module 1760, the Filter module 1770, the Print Rendering System 1770, and the Path Tracing module 1786 are typically implemented as software or hardware components in an embedded system residing on the imaging device 1750. Such an embedded system is a simplified version of the computer module 101, with a processor, memory, bus, and interfaces, similar to those shown in FIGS. 1A and 1B. The modules 1760-1790 are typically implemented in software executed within the embedded system of the imaging device 1750. In some implementations, however, the rendering system 1790 may at least in part, be formed by specific hardware devices configured for rasterization of objects to produce pixel data.

The Interpreter module 1720 and the PDL creation module 1730 are typically components of a device driver implemented as software executing on the general-purpose computer system 101, either as part of the EE software application 133 or as part of another software application. One or more of the PDL Interpreter module 1760, the Filter module 1770, the Path Tracing module 1786, and the Print Rendering System 1790 may also be implemented in software as components of the device driver residing on the general purpose computer system 101.

A typical implementation of the Print Rendering System 1790 uses a RIP performing the PSR method. In such an arrangement, for each scanline such as 1803, any edges such as 1805, 1806 of the object 1801 that intersect the scanline 1803 in question are stored in a linked list in increasing order of the scan-line coordinate of their intersection with the scanline 1803. This linked list is referred to as an active edge list.

Before color data is generated for a pixel run such as 1809 between each pair of sequential edge crossings such as 1807, 1808, all active objects must be identified and sorted in z-order, which is a time consuming process. To improve rendering performance, the active objects for each pixel run are saved in the active edge record on the left of the pixel run. It is noted that a pixel run is bounded by two edges, a first edge on the left, and the second edge on the right.

In general, before a scanline is rendered, if either (a) edges in the active edge list are crossing each other at the current scanline, or (b) new edges are inserted into the active edge list at the current scanline, or (c) active edges are expired in the current scanline and removed from the active edge list, then any active object saved in the previous scanline active edge records must be regenerated. Otherwise an active object cache associated with each active edge record is used to generate color data for each pixel run.

The Path Tracing module 1786 generates a path (such as the dashed line 1802) or a set of edges (including all the edges such as 1811-1821-1805 . . . 1806-1813-1812 . . . making up the path 1802) for objects such as 1801, such that the number of scanlines at which new edges must be loaded or formerly active edges must be removed from the active edge list is minimised, when the objects are rendered by the Print Rendering System 179.

An edge record stored in the display list 1785 is typically a data structure representing a monotonic curve in a monotonically increasing fashion down the page.

The edge record locates the starting position of the edge on a page to be printed plus a list of piecewise connected line segments in a monotonically increasing fashion down the page (as depicted in edge 1814 in FIG. 13) representing a portion of a graphic object's fill path. The list of piecewise connected line segments is referred to as the line segment data. A typical edge record without line segment data in a known display list requires approximately 64 bytes of storage space for edge information. The typical edge record includes the coordinate starting x & y position, level activation information, edge direction, edge crossing rounding information, number of line segments in the line segment data, and a memory pointer to the line segment data, Each line segment making up the edge record's line segment data is made up of dx and dy vector components (eg the line segment 1814 is made up of respective three [dx, dy] components 1811, 1809, and 1805) which can be stored in compressed format so that the memory requirement of the line segment such as 1814 can vary in size from 2 bytes up to 6 bytes depending on the length of the line segment. A large number of edges in the display list 1785 will result in high memory usage.

The terms "line segment": and "edge" can be used interchangeably unless noted otherwise. More particularly, an 'edge' is made of one 'line segment' or multiple 'line segments'

Figure 16:
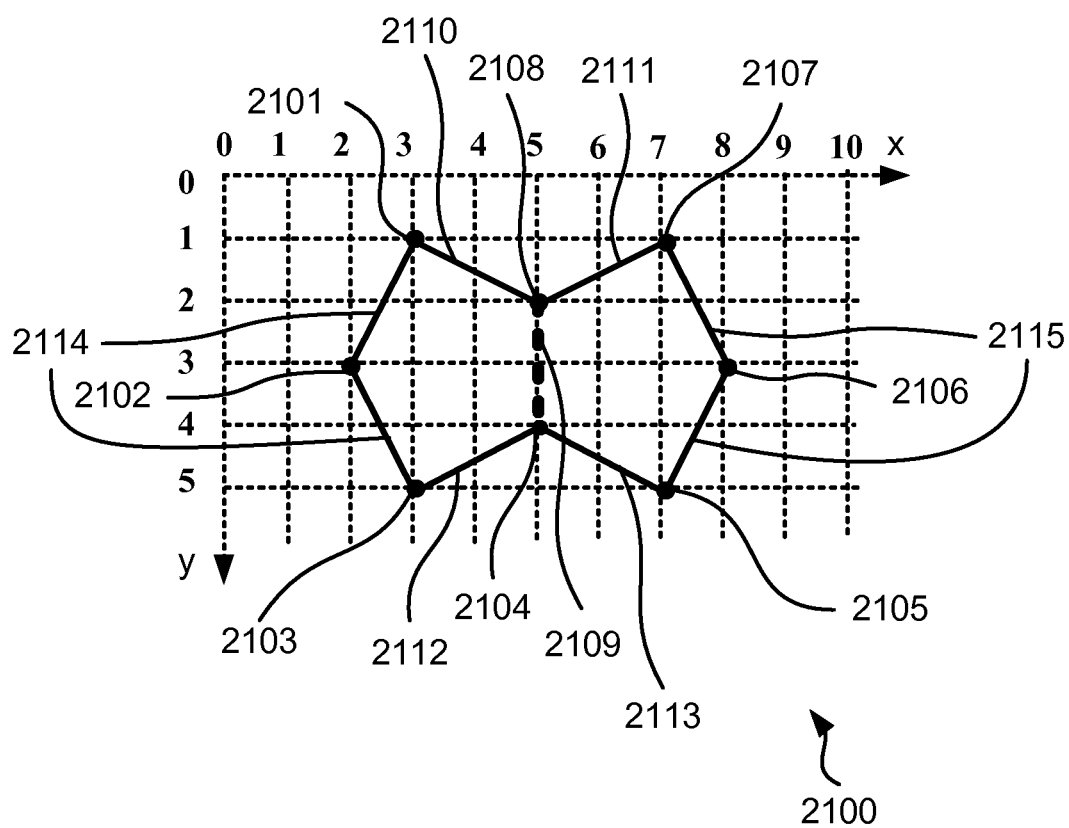
FIG. 16 is an illustration of a fill path object thereof together with their associated terminology.

FIG. 16 show an example of a fill path designated 2100 which has 1 closed path which has the following x-y points (3,1) designated 2101, (2,3) designated 2102, (3,5) designated 2103, (5,4) designated 2104, (7,5) designated 2105, (8,3) designated 2106, (7,1) designated 2107, and (5,2) designated 2108.

A point in a closed path is a maximum point if both its previous point and its next point have smaller coordinate y values, for example points 2108, 2103, and 2105 are the maximum points of the closed path.

A maximum point is a local maximum point if there are other points which have greater coordinate y values. For example the maximum point 2108 is local maximum point.

A point in a closed path is a minimum point if both previous point and a next point have larger coordinate y values, for example points 2101, 2104, and 2107 are the minimum points of the closed path.

A minimum point is a local minimum point if there are other points which have lower coordinate y values. For example the minimum point 2104 is local minimum point.

A monotonic curve of a closed path is a portion of the closed path which must start from a minimum point and ends at a maximum point. There are 2 monotonic For example:

a. An edge 2110 has 2 points 2101 and 2108;
 b. An edge 2111 has 2 points 2107 and 2108;
 c. An edge 2112 has 2 points 2104 and 2103;
 d. An edge 2113 has 2 points 2104 and 2105;
 e. An edge 2114 has 3 points 2101, 2102 and 1203;
 f. An edge 2115 has 3 points 2107, 2106 and 2105;

The Path Tracing module 1786, which is utilised by either the Filter module 1770 and/or the DL generation module 1780, also reduces the number of edges when processing the objects' fill path for example 2100 in FIG. 16 for the described PSR system. Typically two pairs of edges such as 2110, 2111, 2112, and 2113 are generated for a pair of local minimum point such as 2104 and local maximum point such as 2108 of the path 2100. If the closed path 2100 can be cut into 2 closed paths between the local maximum point 2108 and the local minimum point 2104 as shown by the dashed line designated 2109, which allows the two edges end at the local maximum 2108 (2110 and 2111) to be joined with the two edges start at the local minimum 2104 (2112 and 2113) with a line segment from the point 2108 to the point 2104. By splitting the closed path 2100 into two closed paths, the points 2104 and 2108 are no longer minimum or maximum points. Therefore reducing the number of local minimum and local maximum points will reduce the number of edges generated. To achieve the objectives set above, the Path Tracing module 1786 uses two techniques when converting pixel runs to paths:

a. Joining vertically disjoint pixel runs together where "feasible" and
 b. Breaking a long pixel run in the current scanline into two or more pieces if appropriate so that multiple overlapped pixel runs above and below the current scanline, and one of the pieces of the long pixel run can be joined together.

Figure 13:
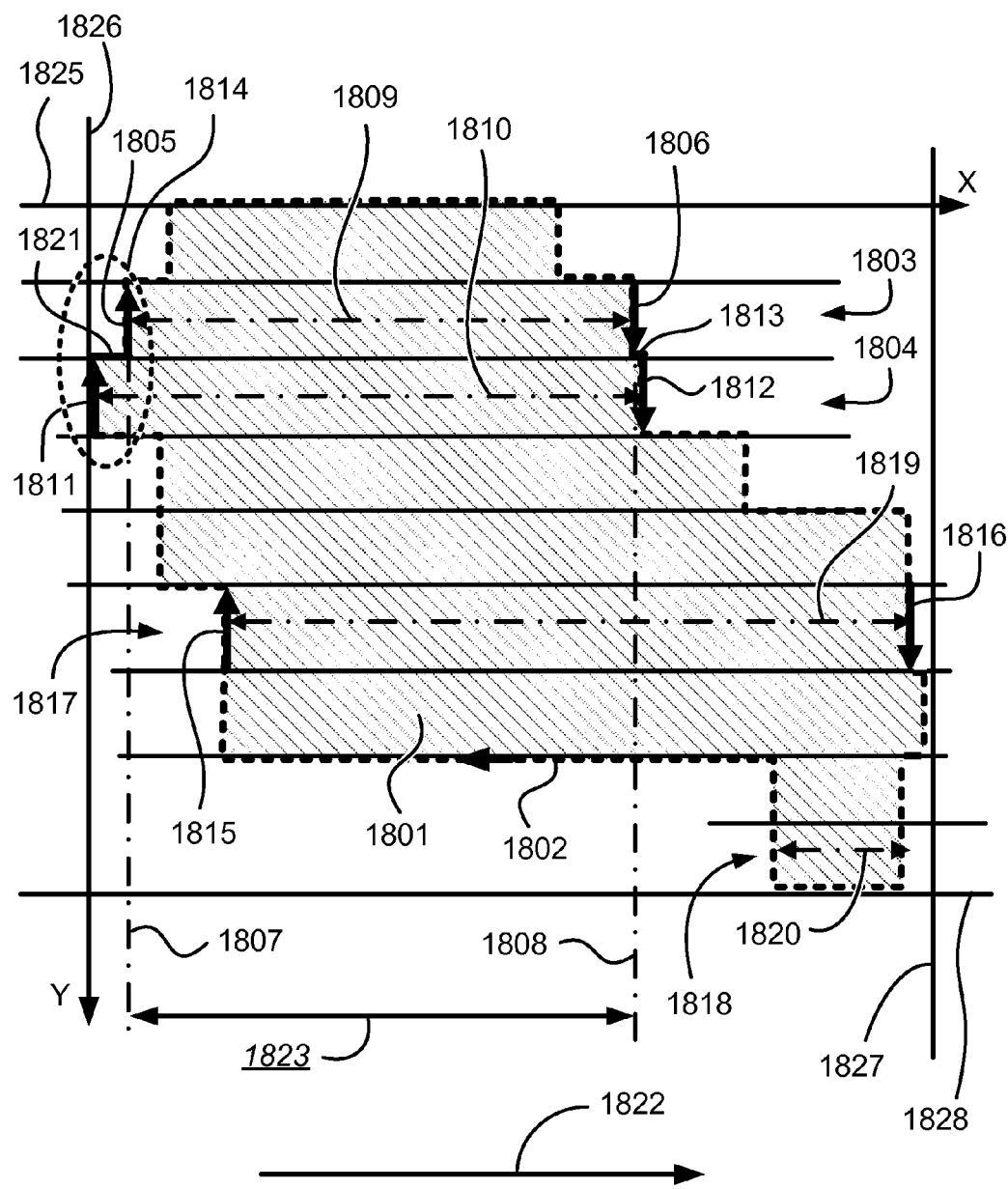
FIG. 13 is an illustration of a graphic object and various elements thereof together with their associated terminology.

The term "overlap" can be understood with reference to FIG. 13. It is firstly noted that the term overlap is taken to mean either complete overlap or partial overlap unless stated otherwise. For example, the pixel run 1809 on the scanline 1803 is both adjacent to the pixel run 1810 on the scanline 1804, and overlaps the pixel run 1810 since both the noted pixel runs have at least some common X coordinate values. The pixel run 1809 on the scanline 1803 is not adjacent to the pixel run 1819 on the scanline 1817 however it does overlap the pixel run 1819. The pixel run 1809 is not adjacent to the pixel run 1820 on the scanline 1818 and does overlap the pixel run 1820.

Figure 8B:
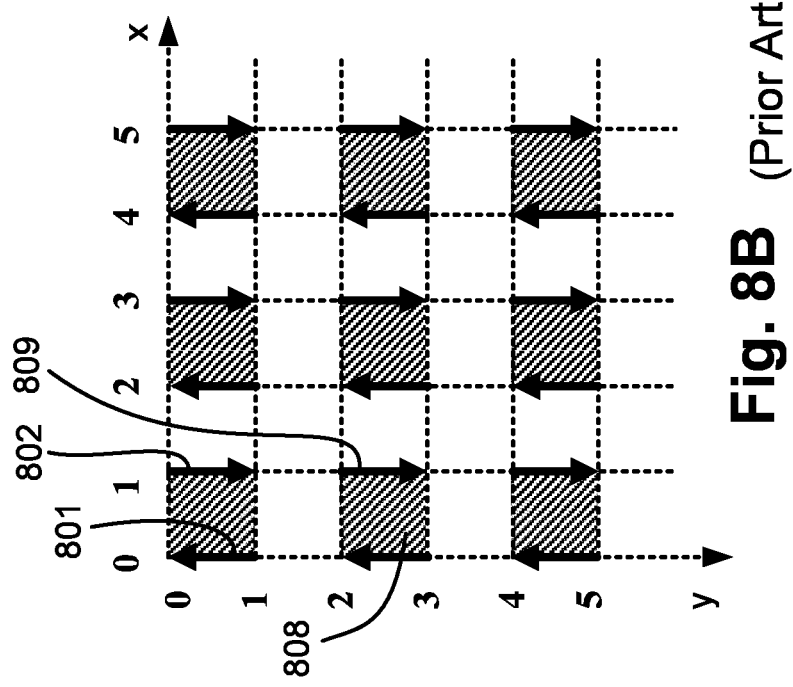
FIG. 8B is a diagram illustrating a prior art path tracing result from the pattern of FIG. 8A.
Figure 8A:
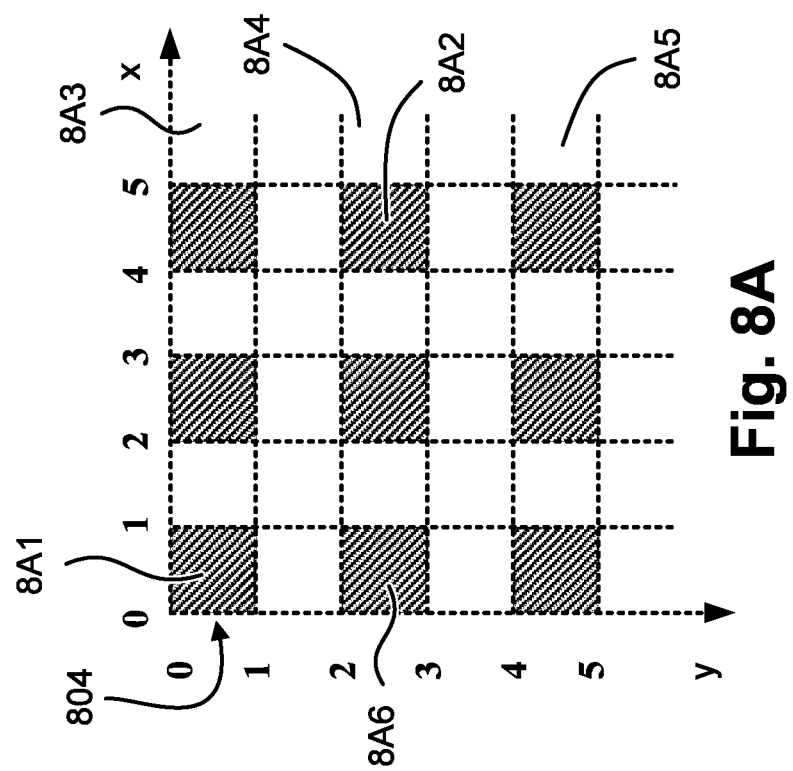
FIG. 8A is a diagram illustrating an example of a pattern for joining paths.

FIG. 8A is a diagram illustrating an example of a pattern for joining paths and shows a disjoint pixel pattern (ie a set of non-adjacent pixels) produced by combining paths of one or more graphic objects (being individual pixels in this example) of the same color attribute. The combining of paths in this example leads to formation of nine distinct closed paths, one surrounding each pixel. The hatched areas depict active-pixels that are to be filled according to a particular color attribute. The non-hatched-areas depict background that is not to be filled according to the color attribute. For example at a scanline 0 which is designated 8A3 (which actually refers to the scanline 804), the active-pixel designated 8A1 (which is a graphic object), having its upper left corner at the x-y coordinate (0,0), is defined by a closed path with the following x-y coordinate points (0,0), (1,0), (1,1), and (0,1). There are 9 disjoint pixels depicted in FIG. 8A. The scanline 'n' in FIGS. 2, 8, and 12 means a scanline in parallel to x-axis and located at between n and n+1 of the y coordinate.

Pixel runs are the combined result of scanline conversion of paths of graphics objects of the same color attribute. Each pixel run is designated using the notation [left, right) which refers to the left position and right position of 2 vertical edges (such as 1805 and 1806 in FIG. 13) which are 1 scanline high and define the boundaries of the pixel run in question (eg the pixel run 1809 in FIG. 13). A pixel run is defined by a boundary that containing all connected active pixels in the same y scanline between a particular pair of associated edge crossings. For example at a scanline 2 designated 8A4 in FIG. 8A, a pixel run 8A2 is designated [4, 5). A left vertical edge associated with this pixel run 8A2 is a vertical line segment from (4, 2) to (4, 3). The right vertical edge associated with this pixel run is a vertical line segment from (5, 2) to (5, 3). Referring to FIG. 8A, the hatched patterns in FIG. 8A represent the following pixel runs:

a. At scanline 0 designated 8A3, there are three pixel runs [0, 1), [2, 3), and [4, 5).
 b. At scanline 2 designated 8A4, there are three pixel runs [0, 1), [2, 3), and [4, 5).
 c. At scanline 4 designated 8A5, there are three pixel runs [0, 1), [2, 3), and [4, 5).

FIG. 8B is a diagram illustrating a prior art path tracing result from the pattern of FIG. 8A and shows the result of a known path tracing algorithm from processing pixel runs data shown in FIG. 8A. The "up-the-page" arrows such as 801 and "down-the-page" arrows such as 802 depict the left and right edges of the corresponding pixel runs respectively. Hereinafter this convention is used to identify left edges and right edges of pixel runs.

In FIG. 8B, there are 9 pairs of up and down edges, which correspond to 18 edges where each edge is made up of one vertical line segment. If the pattern in FIG. 8A is repeated throughout a large area, clearly the number of edges generated from the aforementioned known prior art algorithm increases significantly.

Typically in a PSR system, if a pair of left and right edges that span multiple scanlines are coincident at one or more scanlines (where the term "coincident" means that the edges in question lie precisely on top of each other, the coincident scanline portion will have an empty fill portion where the pixel run left and right values are the same. The pixel run in such cases are designated $[x_1, x_1)$ FIG. 8D shows an example of 2 edges with a coincident line segment. FIG. 8D shows two graphic objects, a first object 8D6 and a second object 8D7. The object 8D6 is associated with an edge pair 8D1;8D2. The object 8D7 is associated with an edge pair 8D4;8D5. The edge 8D2 of the first object 8D6 is displaced from the edge 8D1 of the first object 8D6 in a same scan direction 811 as the edge 8D5 of the second object 8D7 is displaced from the edge 8D4 of the second object 8D7. A first edge 8D1 has the following x-y points (0,0), (0,1), (2,1), (3,4), (1,4), and (1,5) A second edge 8D2 has the following points (5,0), (5,1), (2,1), (3,4), (4,4), and (4,5). The inclined diagonal angle line segment 8D3 from (2,1) to (3,4) is the coincident line segment between the edge 8D1 and the edge 8D2 which produces an empty fill portion from scanline 1 to scanline 4.

The disclosed EE arrangement utilises the fact that coincident scanline portion line segments of left and right edges produce empty fill portions. For example, referring to FIG. 12, in one EE example when processing graphical object paths, the DL Generation module 1780 detects whether any 2 disjoint paths (eg see 805 and 806 in FIG. 8D) are in vertical proximity (ie the distance 803, which is also referred to as a scanline gap, meets certain criteria) for joining. If this is the case, then the left and right edges of the first disjoint path are extended so that they are coincident in the gap portion (as depicted by 8D3 in FIG. 8D), and further extended to include all the line segments of the left and right edges of the second detected disjoint path. The left and right edges of the $2^{nd}$ disjoint path are discarded.

Figure 14A:
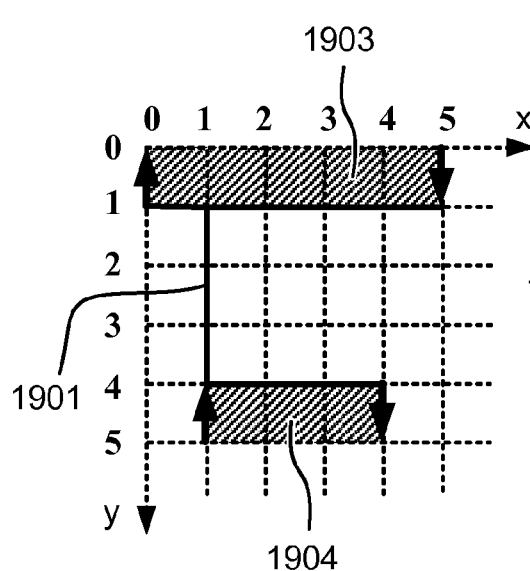
FIGS. 14A, 14B, and 14C illustrate examples of graphic objects and how the EE arrangement is used to generate new edge pairs.
Figure 14C:
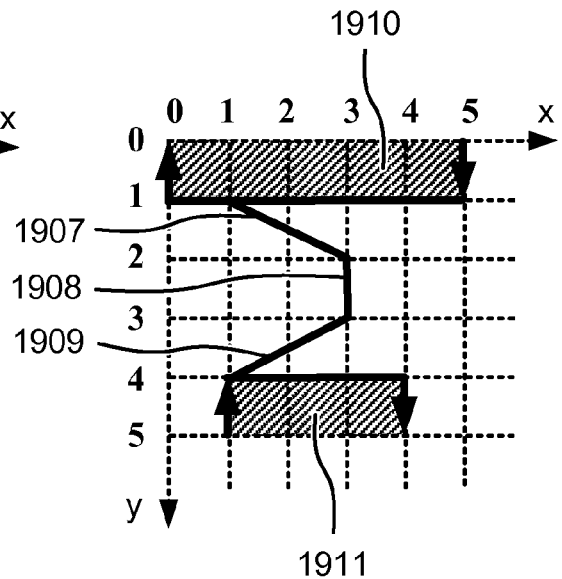
Figure 14B:
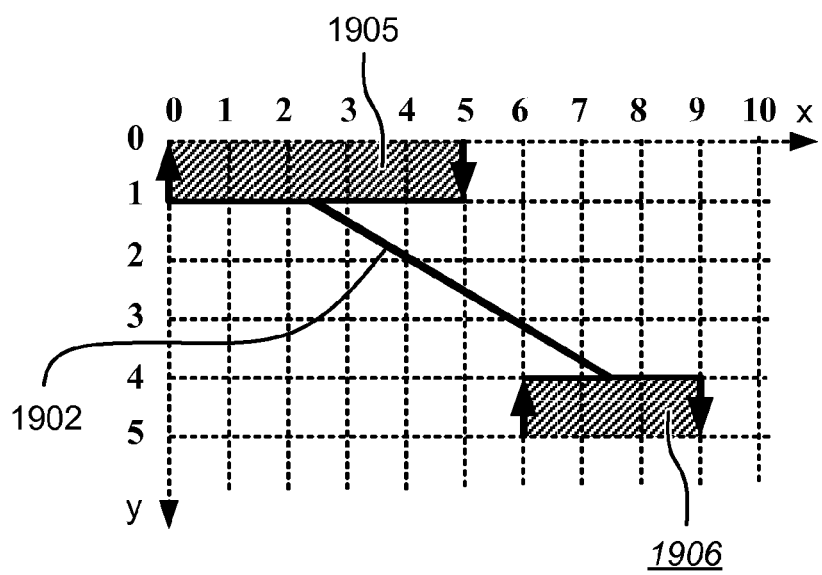

The coincident scanline portion line segments in the EE arrangements of the left and right edges can be vertical (see 1901 in FIG. 14A) or at an inclined angle (see 1902 in FIG. 14B), and the start and end x-positions can be anywhere (eg pixel runs 1903 and 1904 overlap in FIG. 14A whereas pixel runs 1905 and 1906 in FIG. 14B do not overlap). However in practice, the start and end x-positions are chosen so that the number of line segments introduced for either left, right, or both edges are minimised.

Furthermore, the coincident scanline portion line segments in the EE arrangements of the left and right edges can compose of multiple line segments (such as line segments 1907, 1908, 1909 in FIG. 19C) for joining pixel runs 1910 and 1911 in FIG. 14C.

When the joining edges are rastered by a typical PSR renderer, the coincident scanline portion line segments of a pair of left and right edges will add some cost to the rendering process. In particular, the longer the scanline portion in the scanline gap such as 803 in FIG. 8D, the higher the cost. Therefore the DL Generation module 1780 limits a maximum joining distance of the gap scanline portion 807 to either (a) a predetermined value, or (b) dynamically using a cost estimation function for working out the maximum joining distance limit.

The predetermined value for option (a) is done by comparing system performance with varied maximum joining distance limits (eg from 1 scanline to 1000 scanline), then the corresponding maximum joining distance limit with best system performance is chosen.

The option of dynamically using a cost estimation function for option (b) for determining the maximum joining distance limit is based on the following:
  a. –T1 the estimated time for loading a new edges into the AEL at the end of the scanline gap using the current display list complexity by the Print Rendering System 1790;
  b. –T2 the estimate time for unloading an active edge from the AEL at the start of the scanline gap using the current display list complexity by the Print Rendering System 1790;
  c. –T3: Time process 2 edges with 1 scanline height empty fill portion by the Print Rendering System 1790
  Roughly the maximum joining distance limit is (T1+T2)/T3.

FIG. 8C is a diagram illustrating a EE arrangement result from the pattern of FIG. 8A and depicts an example of joining edges of overlapping pixel-runs in FIG. 8A by DL Generation module 1780 according to the EE arrangement. The result of using the EE arrangement is there are only 6 resultant edges as follows:
  a. Edges of pixel runs [0, 1) of scanline 0, 2, & 4 are joined together as follows:
    (a) Pixel run [0, 1) of scanline 0 has the left edge 8L1, and right edge 8R1, both being vertical edges.
    (b) Pixel run [0, 1) of scanline 2 has the left edge 8L5 which is in a vertical line with the edge 8L1, and the right edge 8R3.
    (c) Pixel run [0, 1) of scanline 4 has the left edge 8L9, and the right edge 8R5.
    (d) The left edge 8L1 is extended to include line segments 8L2, 8L3, 8L4, 8L5, 8L6, 8L7, 8L8, and 8L9. A vertical distance 812 between the top of the edge 8L1 and the bottom of the edge 8L9 is referred to as the vertical scanline span covering the edge pairs 8L1;8R1, 8L3;8R2, 8L5;8R3, 8L7;8R4, and 8L9;8R5.
    (e) The horizontal line segments 8L2, 8L4, 8L6 & 8L8 (also referred to as horizontal edge segments are inserted to the left edges to ensure that the left edge is monotonic and continuous from point (0, 0) to point (0, 5) in the x-y coordinate.
    (f) The right edge 8R1 is extended to include line segments 8R2, 8R3, 8R4, 8R5.
    (g) The line segments 8L3 and 8R2, referred to as scanline gap line segments, are coincident and form an empty fill portion between scanline 1 and scanline 2, where 8L3, and 8R2 are the left and right edges respectively.
    (h) The line segments 8L7 and 8R4 are coincident and form an empty fill portion between scanline 3 and scanline 4, where 8L3, and 8R2 are the left and right edges respectively.
  b. Edges of pixel runs [2, 3) of scanline 0, 2, & 4 are joined together in a similar fashion.
  c. Edges of pixel runs [4, 5) of scanline 0, 2, & 4 are joined together in a similar fashion.

Figure 2A:
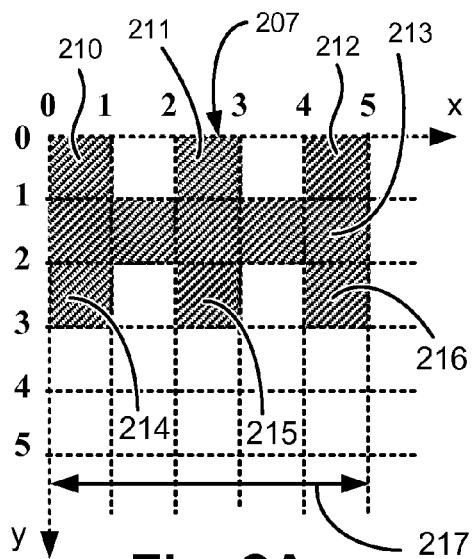
FIG. 2A is diagram illustrating an example of a pattern for splitting pixel runs.

FIG. 2A is diagram illustrating an example of a pattern for splitting pixel runs. FIG. 2A shows a joined-pixel pattern produced by combining paths of one or more graphic objects of the same color attribute. All pixels are joined together; the joined-pixel pattern can be converted to pixel-run format as follows:
   a. Atscanline 0, there are three pixel runs [0, 1), [2, 3), and [4, 5), respectively designated by reference numerals 210, 211 and 212.
   b. Atscanline 1, there is one pixel runs [0, 5), designated with a reference numeral 213.
   c. At scanline 2, there are three pixel runs [0, 1), [2, 3), and [4, 5), respectively designated by reference numerals 214, 215 and 216.

Figure 2C:
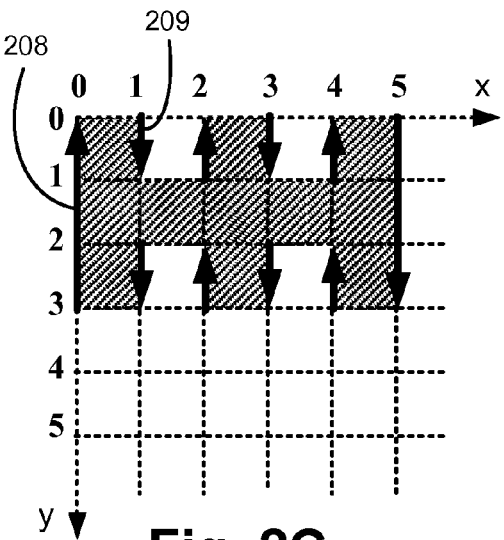
FIG. 2C is a diagram illustrating a prior art path tracing result from the pattern of FIG. 2A.

FIG. 2C is a diagram illustrating a prior art path tracing result from the pattern of FIG. 2A. Using a known path tracing algorithm, the pattern in FIG. 2A will produce 10 edges as shown in FIG. 2C.

Clearly the known path tracing algorithm will produce too many edges if the pattern is repeated (or tiled) in both x and y direction, which would likely cause performance and memory problems in the Print Rendering System 1790.

The Path Tracing module 1786 can, by using the EE arrangements, reduce the number of edges generated from the pattern described in FIG. 2A by breaking a pixel run in the current scanline into two or more pieces so that multiple overlapped pixel runs above and below the current scanline, and one of the pieces of the pixel run on the current scanline, can be joined together. The result is shown in FIG. 2B.

Figure 2B:
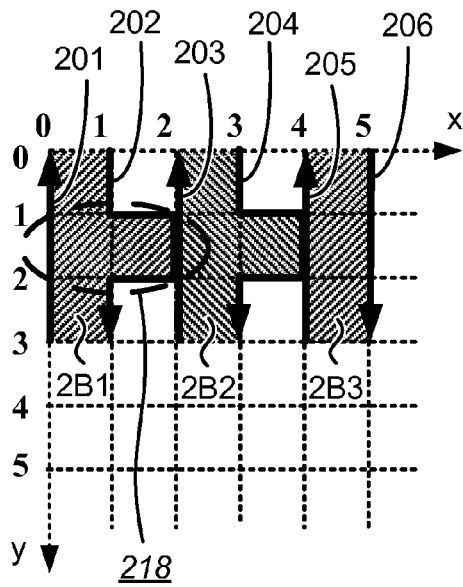
FIG. 2B is a diagram illustrating a EE arrangement result from the pattern of FIG. 2A.

FIG. 2B is a diagram illustrating a EE arrangement result from the pattern of FIG. 2A. The pixel run [0, 5) at scanline 1 is broken down into [0, 2), [2, 4), and [4, 5) which allows the following:
   a. pixel runs [0, 1) at y=0, [0, 2) at y=1, and [0, 1) at y=2 are joined together. This is depicted by forward-hatched area 2B1 which is bounded by a left edge 201 having x-y points (0,0), and (0,3), and a right edge 202 having x-y points (1,0), (1,1), (2,1), (2,2), (1,2), and (1,3) in the x-y coordinate.
   b. pixel runs [2, 3) at y=0, [2, 4) at y=1, and [2, 3) at y=2 are joined together. This is depicted by a backward-hatch area 2B2 which is bounded by a left edge 203 having x-y points (2,0) and (2,3), and a right edge 204 having x-y points (3,0), (3,1), (4,1), (4,2), (3,2), and (3,3) in the x-y coordinate.
   c. pixel runs [4, 5) at y=0, [4, 5) at y=1, and [4, 5) at y=2 are joined together. This is defined by a forward-hatch area 2B3 which is bounded by a left edge 205 having x-y points (4, 0) and (4, 3), and a right edge having x-y points (5, 0) and (5, 3).

Both the Filter Module 1770 and the DL generation Module 1780 can be used to simplify paths of 1 or more objects of the same fill color attribute. If the Filter Module 1770 is used the result are simple paths which are paths that are not self-intersected or overlapping one another. The simple path can be used with an ODD-EVEN fill rule. If the DL generation Module 1780 is used the result is edges which can be used with an ODD-EVEN fill rule. Both modules simplify paths using the Path Tracing module 1786.

Figure 3:
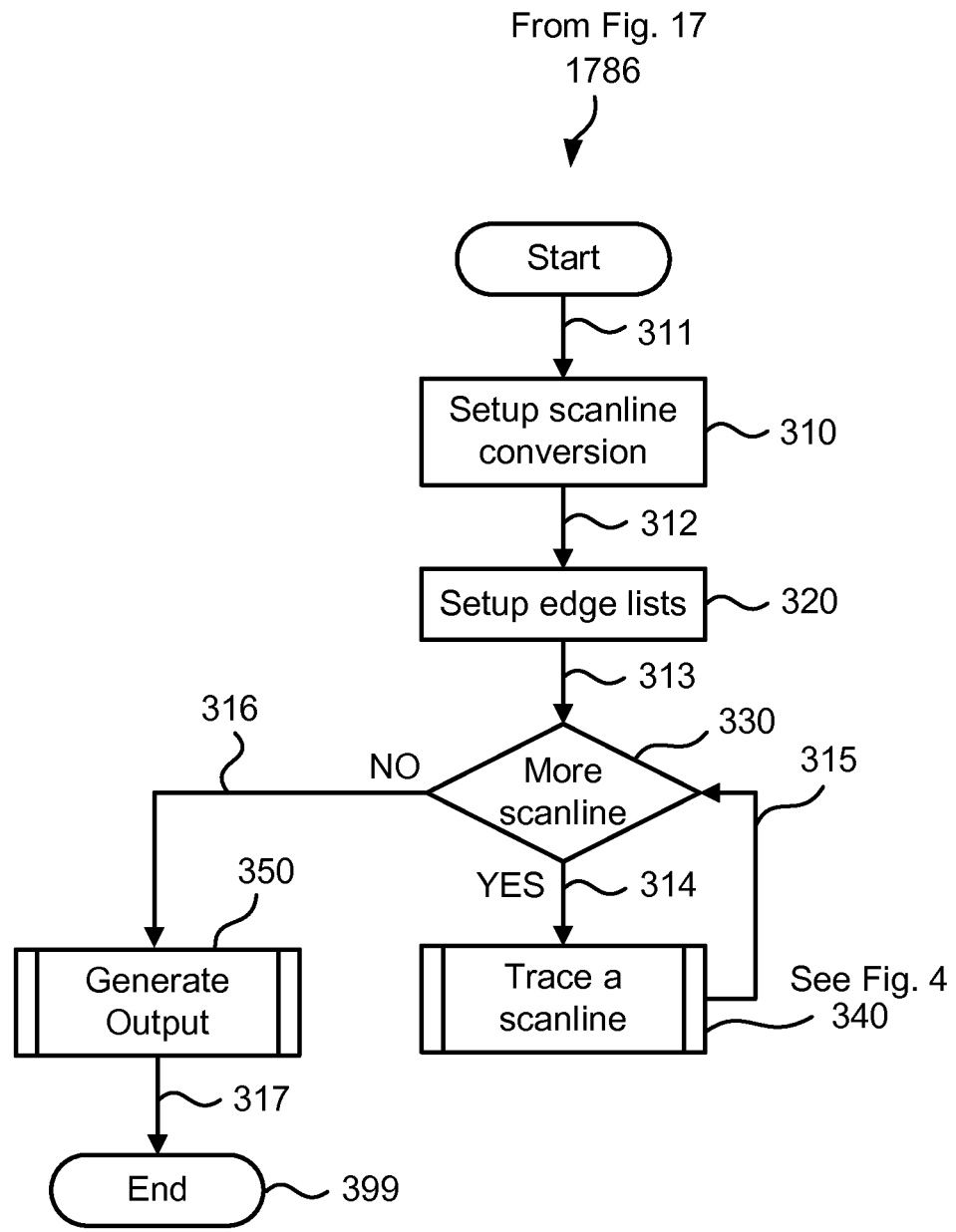
FIG. 3 is a schematic flow diagram illustrating a method for combining objects' paths in accordance with a EE arrangement.
Figures 9, 10:
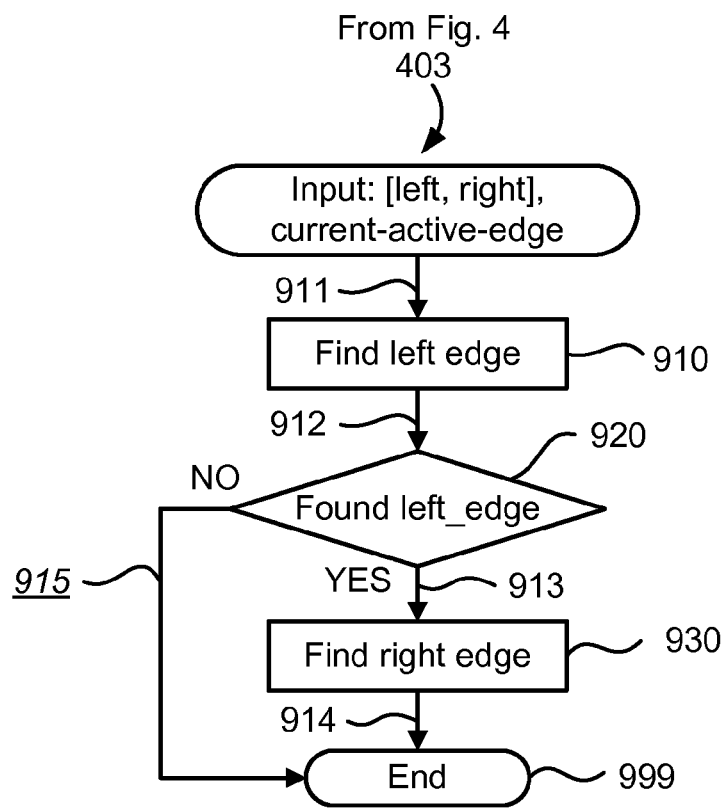
FIG. 9 is a schematic flow diagram illustrating a method for finding left and right edge from an active edge list as used in the method of FIG. 4.
FIG. 10 illustrates an edge C program data structure used in the method of FIG. 3.

FIG. 10 illustrates an edge C program data structure used in the method of FIG. 3 and shows a typical C program fragment for the edge data structure that can be used to store an edge record in the Path Tracing Module 1786 for performing the EE arrangement. The program fragment comprises the following:
   a. Next & Prev are edge pointers for linking edges in a double-linked list.
   b. JoinStart is a pointer to another edge to indicate that the edges starting points can be joined together with a horizontal line segment to form a closed path. Typically, edges are created in pairs. When a pair of edges is created, the JoinStart pointers for the edges reference each other.
   c. JoinEnd is a pointer to another edge to indicate that the edges end points can be joined together with a horizontal line segment to form a closed path.
   d. A Boolean flag IsLeft indicates that the edge is on the left (TRUE) or on the right (FALSE) of all pixel runs respectively.
   e. StartX, StartY are the respective x and y positions of the first point of the edge.
   f. EndX, EndY are the respective x and y positions of the last point of the edge. These values are updated when a new line segment is added to the edge.
   g. SegData is an array of line segments in vector form [dx, dy], for describing the edge monotonic curve in piecewise line segment format; and
   h. SegCount is the number of line segments stored in SegData.

Methods for creating edge records and adding line segments to an edge record may be implemented using the known linked list method or other methods known in the art.

An edge is active at a scanline if the associated piecewise monotonic curve (such as the line segment 1814 in FIG. 13) intersects with the scanline. Otherwise an edge is considered to be inactive.

The Path Tracing Module 1786 will now be described in detail including the steps to minimise the number of output edges.

FIG. 3 is a schematic flow diagram illustrating a method for combining objects' paths in accordance with a EE (Edge Extension) arrangement, and shows an example of the operation of the Path Tracing Module 1786. As described in regard to FIG. 12, the Filter module 1770 coalesces candidate object data and generates a coalesced object in the second common intermediate format. The process 1786 receives the coalesced object from the Filter Module 1770 and following an arrow 311 starts with a setup scanline conversion step 310, performed by the processor 105 as directed by the program 133, in which paths of the one or more objects are converted into a format that is suitable for scan-conversion. Typically this involves generating edges, levels, and fills associated with each object. The visual bound of each object is determined. In order to work out a minimal path-tracing region, the accumulated visual bounding box of all the objects is determined (ie the accumulated visual bounding box boundary for the object described in FIG. 13 is a rectangle where top, left, right, and bottom are respectively depicted by lines 1825, 1826, 1827, and 1828 in FIG. 13).

After the step 310 following an arrow 312, a step 320 is carried out to setup edge lists. The Path Tracing Module 1786 maintains 3 edge lists as follows:
   a. An Active Edge List (AEL) is a list of all the currently active edges up to the current processing scanline. The new edges become active since the new edges can be loaded into AEL at any of the previous scanlines) These edges are sorted in EndX incremental order.
   b. An Inactive Edge List (IEL) is a collection of all the inactive edges. These edges are used for outputting the tracing result in a process 350, described hereinafter in more detail below.
   c. A temporary inactive edge list (TIEL) is a collection of all edges that have become inactive at a current scanline while processing pixel runs of the current scanline. The edges are sorted in EndX order. At the start of each scanline, TIEL is initialised to be empty. At the end of each scanline, all edges in the TIEL are moved to the IEL. This is done to ensure that edges in the IEL are always sorted firstly in the y decrement order and then in the x increment order.

Typically the edge lists AEL, IEL, TIEL are implemented using double linked lists where the start and the end of each list are initialised with sentinel dummy edges, which make it easier to add edges to either the start or the end of the edge list, or to remove edges from the edge list. However the edge lists can also be implemented as any ordered collections known in the art, e.g. arrays, queue, single linked list, etc.

Continuing from the step 320 following an arrow 313, a following step 330 determines whether there are more scanlines to be processed. If there are more scanlines to be processed, following a YES arrow 314 a following process 340 is carried out. Otherwise, following a NO arrow 316 a following process 350 is carried out. The first scanline to be processed by the steps 340 and 350 is the top (ie line 1825 in FIG. 13) of the accumulated visual bounding box determined in the step 310. The last scanline to be processed is the bottom (ie line 1828 in FIG. 13) of the accumulated visual bounding box determined in the step 310.

Figure 4:
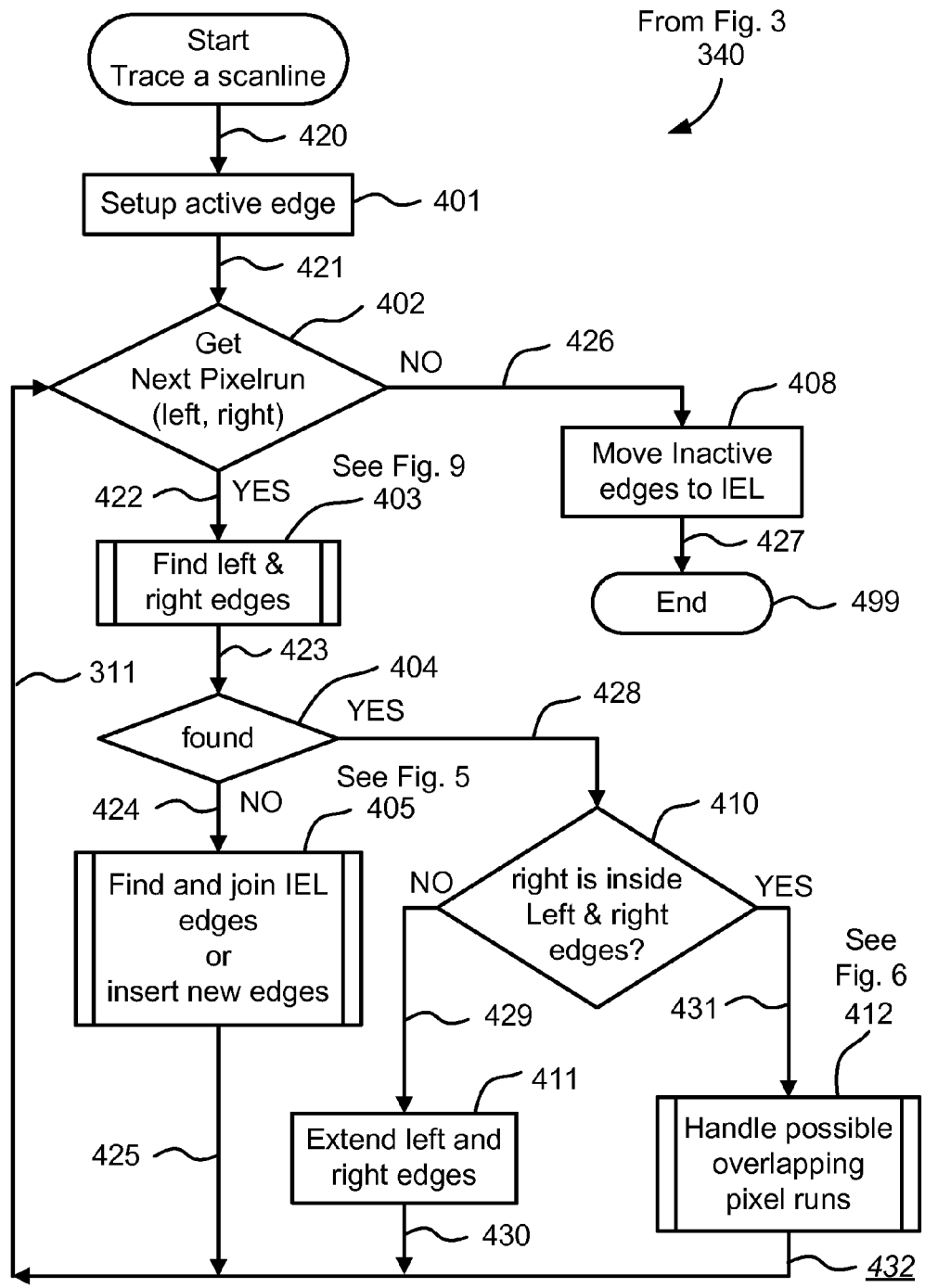
FIG. 4 is a schematic flow diagram illustrating a method for tracing a scanline as used in the method of FIG. 3.

The Process 340 which performs the "trace a scanline" process, described hereinafter in more detail with reference to FIG. 4, is carried out to process all the pixel runs for the current scanline. After each performance of the "trace a scanline process" the process 1786 follows an arrow 315 from the step 340 back to the step 330.

Figure 15:
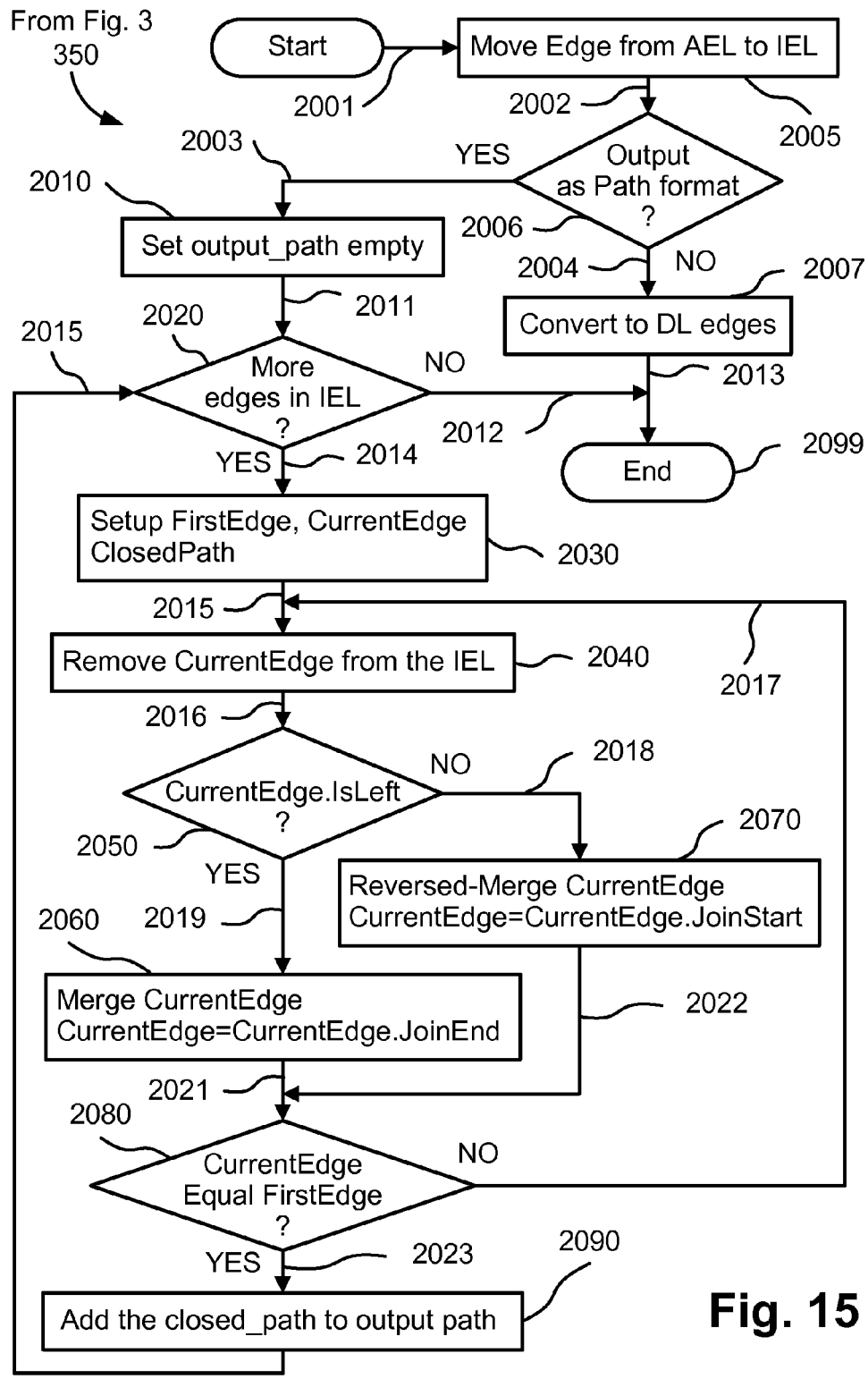
FIG. 15 is a schematic flow diagram illustrating a method for generating output as used in the method of FIG. 3.

Once the step 330 determines that there are no further scanlines, then following the NO arrow 316 the process 350 which performs the "Generate Output" process, described hereinafter in more detail with reference to FIG. 15, is carried out. Then, following an arrow 317, a STOP step 399 is carried out which ends the Path Tracing Module process 1786.

The disclosed Path Tracing Module 1786 describes a process for processing pixel runs from left to right, from top to bottom, of the accumulated visual bounding box. It is also possible to use other rasterizing orders. Line segments of edges produced by the Path Tracing Module 1786 are in staircase format where a line segment can be either vertical or horizontal. Typically there are repeated patterns in the edge line segment data. Known line fitting techniques such as is described in Australian Patent Application No. 2005202216 can be used to merge multiple line segments into 1 single line segment. For example the 4 line segments ([dx, dy]: (1,0), (0,1), (1,0), and (0,1)) in sequence can be replaced with a inclined angle line segment (2,2). Alternatively, known compression techniques can be used to reduce edge line segment data memory usage.

FIG. 15 depicts an example of a flowchart for performing the "Generate Output" process 350 in more detail. Following an arrow 2001 the process 350 starts with a step 2005 to move edges in the active edges list AEL into the inactive edge list IEL. All edges in the IEL are the tracing result of Path Tracing Module process 1786 to be output.

Following an arrow 2002 from the step 2005, a following step 2006 is carried out to determine the output format to generate. If output can be in path format (i.e. for the Filter Module 1770), then following a YES arrow 2003 a following step 2010 is carried out. Returning to the step 2006, if the output is not in path format (ie for DL generation module 1780), then following a NO arrow 2004 a following step 2007 is carried out.

Step 2007 "Convert to DL edges" takes all the edges in IEL in the current format and converts to edge format for Display List 1785. Then, following an arrow 2013, a STOP step 2099 is carried out which ends the Generate Output process 350.

Step 2010 sets the output path "output_path" to be an empty path. The "output_path" will be the output when Generate Output process 350 ends. Then following an arrow 2011, step 2020 is carried out.

In step 2020 if there are more edges in the IEL, follow a YES arrow 2014 to a following step 2030, otherwise follow a NO arrow 2012 to the STOP step 2099 which ends the Generated Output process 350.

Step 2030 sets up various variables to generate a closed path where the first edge in the IEL is a portion of the closed path. Variables "FirstEdge", and "CurrentEdge" are set to be the first edge in IEL. Variable "ClosedPath" is set to be an empty path to allow for path data to be added to the path. Then following an arrow 2015 a following step 2040 is carried out.

Step 2040 removes CurrentEdge from the IEL. Then following an arrow 2016 a step 2050 is carried out.

In step 2050, if the CurrentEdge.IsLeft is TRUE, then following a YES arrow 2019 a step 2060 is carried out. Otherwise following a NO arrow 2018 from step 2050, a step 2070 is carried out.

Step 2060 comprises
a. converting the edge segment data of the CurrentEdge into a list of x-y points defined the edges' monotonic curve which is a portion of the generated closed path ClosedPath,
b. merging list of points into the variable ClosedPath,
c. setting CurrentEdge to be CurrentEdge.JoinEnd which is the next edge which has another portion of the closed path to be merged into the variable Closed Path, After step 2060, following an arrow 2021 a step 2080 is carried out.

Step 2070 comprises
a. converting the edge segment data of the CurrentEdge into a list of points defined the edges' monotonic curve which is a portion of the generated closed path Closed Path,
b. reversing list of points. For example if the portion of a closed path has 3 x-y points (0,0), (1,0), (1,2), the reversed portion of the closed path become (1,2), (1,0), (0,0).
c. merging list of x-y points into the variable ClosedPath,
d. setting CurrentEdge to be CurrentEdge.JoinStart which is the next edge which has another portion of the closed path to be merged into the variable Closed Path, After step 2070, following an arrow 2021 a step 2080 is carried out.

Step 2080 determines whether the CurrentEdge is the same as the FirstEdge. If TRUE, following a YES arrow 2023 a step 2090 is carried out. Otherwise following a NO arrow 2017 the step 2040 is carried out.

Step 2090 adds the generated closed path "ClosedPath" to the output path. Then following an arrow 2015, the step 2020 is carried out.

The output generation process 350 may also be implemented using other methods known in the art for simple path reconstruction.

FIG. 4 depicts an example of a flowchart for performing the "Trace a scanline" process 340 to determine if edges of pixel runs in a current scanline and edges generated in previous scanlines are jointed together or a pixel run in a previous scanline is split based on the position of the edges of pixel runs in a current scanline. Following an arrow 420 the process 340 starts with a step 401 to set up the active edges list AEL. The currently-active-edge is defined to be the head of the AEL. The TIEL should be empty at this point.

Recalling that the active edge list AEL contains the active edges sorted in ascending order of their EndX values in the previous scanline, edges from the head of the AEL to the last edge before the currently-active-edge are the active edges at this present (current) scanline. Edges from the currently-active-edge to the end of the AEL are the active edges from the previous scanline.

Following an arrow 421 from the step 401, a following step 402 is carried out to determine if there are any more pixel runs [left, right) in the current scanline. If this is not the case, then following a NO arrow 426 a following step 408 is carried out. Returning to the step 402, if there are more pixel runs, then the pixel run [left, right) is set to be the next pixel run to be processed, and following an arrow 422 the process 403, described hereinafter in more detail with reference to FIG. 9, is followed.

The process 403 returns a pair of edges: a left edge and a right edge where:
  a. The edges are picked from the currently-active-edge-list and the end of the AEL.
  b. the left edge is the left edge of the first edge pair from the currently-active-edge-list to end of the AEL which the edge pair EndX values are overlapping the current pixel run, and
  c. the right edge is be the right edge of the last edge pair from the currently-active-edge-list to end of the AEL which the edge pair EndX values are overlapping the current pixel run The process 403 also updates the currently-active-edge to be the next edge in the AEL after the right edge. The process 403 is described hereinafter in more detail in regard to FIG. 9.

Figure 5:
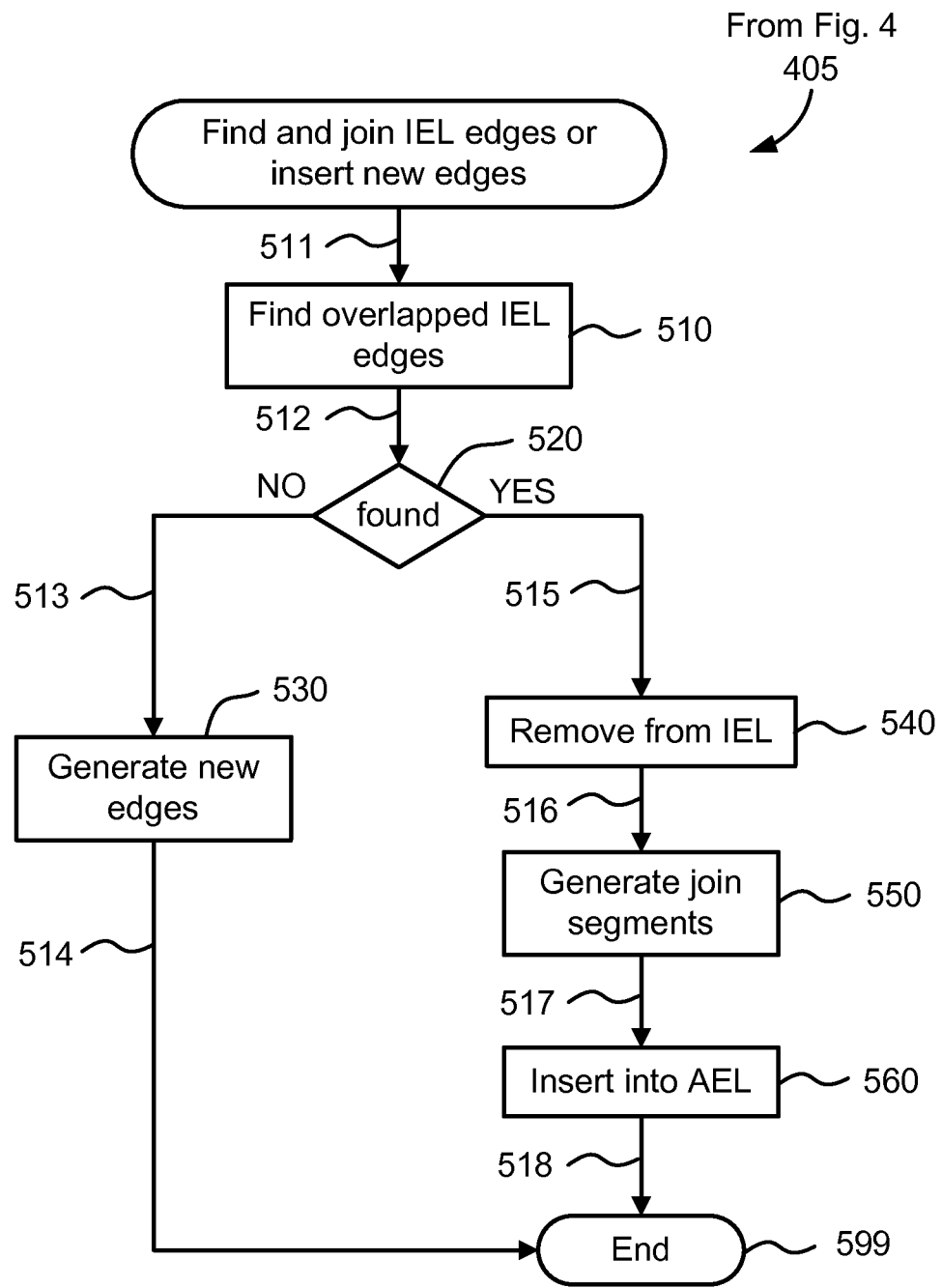
FIG. 5 is a schematic flow diagram illustrating a method for finding and joining edges in an inactive edge list (IEL) or inserting new edges as used in the method of FIG. 4.

After the process 403, following an arrow 423 a step 404 determines whether the process 403 found the left and right edges in the current scanline. If these were not found, following a NO arrow 424 a process 405, described hereinafter in more detail in regard to FIG. 5 is carried out. otherwise following a YES arrow 428 a process 410 is carried out.

As noted, the process 405 relating to "find and join the IEL edge or insert new edges" is described hereinafter in more detail in regard to FIG. 5.

After the process 405, following an arrow 425 the step 402 is carried out again.

Returning to the step 410, this step determines whether the current pixel run 'right' value (x position of the right edge of pixel run) is inside the x-boundary between EndX values of the left and right edges in the previous scanline. If it is not true, following a NO arrow 429 step a step 411 is carried out; otherwise following a YES arrow 431 a process 412 is carried out.

In the step 411, the left and right edges in the previous scanline are extended by adding extra horizontal segment to ensure the ends of the left and right edges in the previous scanline are the same as the left and right value of the current pixel run [left, right), then a 1 scanlinevertical line segment is added to the left and right edges. Then following an arrow 430 the step 402 is carried out again.

The process 412 "handle possible overlapping pixel runs" handles possible multiple pixel runs in the current scanline between the left and right edges in the previous scanline, and is described hereinafter in more detail with reference to FIG. 6. After the process 412, following an arrow 432 the step 402 is carried out again.

In the step 408, all edges from the currently-active-edge to the end of the AEL are removed from AEL and added to the end of TIEL. Then all edges in the TIEL are moved to the front of the IEL. This is done to ensure that the IEL is always sorted in y decrement order then x-increment order for fast searching later.

There must be an even number of edges in the TIEL. For the purpose of reconstructing the path from the edges in the process 350 in FIG. 3, the edges in the TIEL are split into pairs from left to right where each pair of end points can join together with a horizontal line segment. Typically the pair of edges' JoinEnd members are referenced to each other to help the path reconstruction in process 350

After the step 408, following an arrow 427 a step 499 is carried out which ends process 340.

FIG. 9 is a schematic flow diagram illustrating a method for finding left and right edge from an active edge list as used in the method of FIG. 4 and shows an example of a flow chart for the process 403, which is responsible for finding the left and right edges in the AEL. The inputs into process 403 are as follows:
  a. The current pixel pixel run [left, right) at the current scanline, and
  b. The currently-active-edge.

The expect outputs for the process 403 are as follows:
  a. Some edge pairs are moved from AEL to the TIEL;
  b. A pair of edges is provided: left_edge, and right_edge;
  c. A currently-active-edge is advanced to the edge after the right edge, or an edge on the right of the current pixel run [left, right)

Following an arrow 911 the process 403 starts with a step 910 to find a first edge pair in EL starting from the currently-active-edge, whose EndX values overlaps with the current pixel run [left, right) or touches on the right of the current pixel run [left, right). If any edge pair in the AEL, starting from the currently-active-edge, are on the left of the current pixel run[left, right), the currently-active-edge is updated to be the edge after the edge pair, and the edge pair is removed from the AEL and added to the end of TIEL. The left_edge will be set to be the first edge of the first edge pair in the AEL that overlaps with the current pixel run [left, right).

After step 910, following an arrow 912 a step 920 is carried out. If the left_edge is found in the step 920, following a YES arrow 913 a step 930 is carried out, otherwise following a NO arrow 915 a step 999 is carried out which is the end of process 403.

At the step 930, a last edge pair in the AEL is found which is overlapping with the given pixel run [left, right), given that the first edge in the AEL starts at the currently-active-edge. Given that the step 910 has found the left_edge, this step must be successful. The right edge is set to be the right edge of the edge pair. The currently-active-edge is updated to be an edge after the right edge.

Also in the step 930, edges in the AEL, between the left_edge and the right_edge become inactive which are removed from AEL, and added to the end of TIEL. These edges have unique properties as follows:
  a. There must be an even number of edges
  b. The first edge's IsLeft value must be FALSE.
  c. The last edge's IsLeft value must be TRUE.
  d. The edges are in pairs, and the areas bound by the edge pairs are filled with background.

After the step 930 is completed, following an arrow 914 the process 403 is directed to the END step 999.

FIG. 5 is a schematic flow diagram illustrating a method for finding and joining edges in an inactive edge list (IEL) or inserting new edges as used in the method of FIG. 4. FIG.

5 shows the process 405 in more detail. The inputs into the process 405 are the current pixel run [left, right), the currently-active-edge, and the IEL. The process 405 starts with a step 510. The Step 510 finds a pair of left and right edges from pairs of edges in the IEL with the following criteria:
- a. the edge pair EndX values must overlap or touch the current pixel run [left, right), and
- b. IsLeft values of the edge pair must be FALSE (right edge) and TRUE (left edge) respectively, and
- c. EndY values of the edge pair must be the same, and
- d. EndY values of the edge pair must be at most a predetermined number of scanlines above the current scanline named MAX_JOIN_YLENGTH.

Joining pixel runs in the current scanline, which overlap pixel runs in the previous scanline in the x-direction but which are very far apart in the y-direction may reduce PSR rendering performance. MAX_JOIN_Y_LENGTH value is designed to prevent very far-apart disjoint pixel runs which are vertically overlapped in the x-direction from being joined together. MAX_JOIN_Y_LENGTH can also be implemented as a function in a PSR system in term of joining distance, by comparing the CPU processing cost for having a pair of edges active in the joining region versus CPU processing cost for loading a new pair of edges into the active edge list, and remove a pair of active edges from the active edge list during rendering.

After the step 510, following an arrow 512 a step 520 is carried out, which determines if the left and right edges have been found. If this is the case then following a YES arrow 515 a step 540 is carried out, otherwise following a NO arrow 513 a step 530 is carried out.

The step 530 generates a new edge pair named new_left_edge and new_right_edge whose IsLeft values are TRUE and FALSE respectively. The new_left_edge starts from (x, y)=(left, current scanline), and ends at (x, y)=(left, current scanline+1). The new_right_edge starts from (x, y)=(right, current scanline), and ends at (x, y)=(right, current scanline+1). The edges are inserted into the AEL before the currently-active-edge. It also important to ensure the AEL remains sorted in the edges' EndX order.

When the Filter module 1750 uses the Path Tracing Module 1786, the outputs of the Tracing Module 1786 must be closed paths where each closed path is formed by 2 or more edges. When generating a closed path, new_left_edge and new_right_edge in the step 530 must be joined at the starting points by a horizontal line segment. Also at the step 530, it is undetermined whether new_left_edge and new_right_edge will be joined at the end points by a horizontal line segment when forming a closed path. Typically the JoinStart pointers of the edges are set to point to each other, and then the output module 350 can determine how to generate a path from the edges.

After the step 530, following an arrow 514 a step 599 is carried out which ends the process 405.

In the step 540, the pair of left and right edges found in the step 510 are removed from the IEL. Then following an arrow 516 a step 550 is performed to generate joined segments between the pair of left and right edges as follows:
- a. Choosing a joining point P1 where the y value is the scanline where the pair left and right edges end (edges' EndY), and the x value can be any valid value;
- b. Choosing a joining point P2 where the y value is the current scanline, and the x value can be any valid value;
- c. Adding horizontal line segments into the pair of left and right edges to end at the same joining point P1;
- d. Adding the line segments to the pair of left and right edges to end at the same joining point P2. The line segment P1-P2 in both edges forming an empty fill portion between scanline P1.y to P2.y;
- e. Adding horizontal line segments to the pair of left and right edges to end x-y point at (left, current scanline), and (right, current scanline) respectively;
- f. Add a vertical scanline height segment to the pair of left and right edges to end x-y point at (left, current scanline+1), and (right, current scanline+1) respectively.

Typically the joining points P1 and P2 x positions are chosen to be the same—either at the left or the right of the current pixel run. Furthermore there can be one or more line segments adding the pair of edges for joining the point P1 and P2.

After the step 550, following an arrow 517 a step 560 is carried out in which the left and right edges are inserted into the AEL before the currently-active-edges.

After the step 560, following an arrow 518 the step 599 is carried out which ends process 403.

Figure 6:
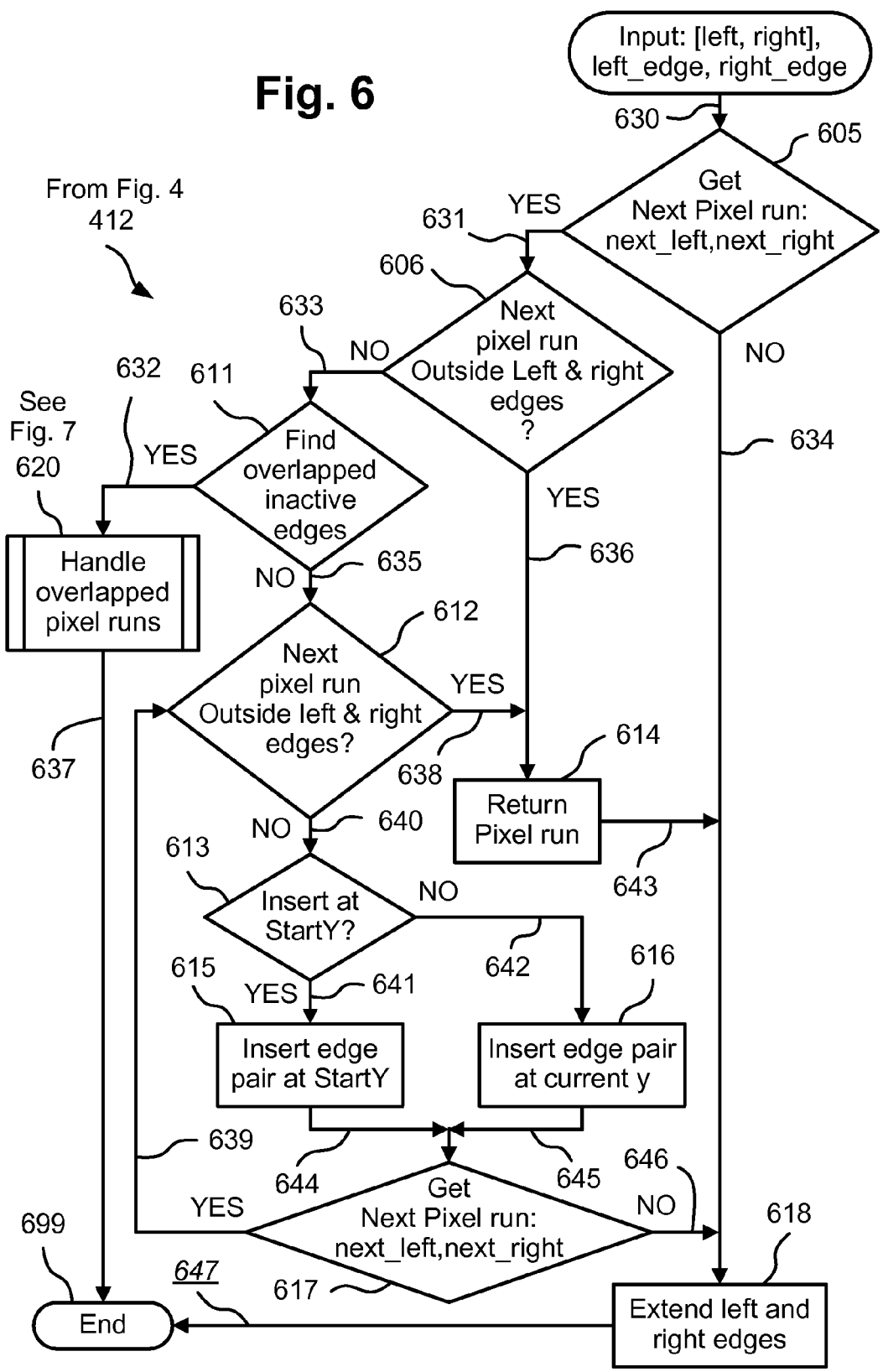
FIG. 6 is a schematic flow diagram illustrating a method for handling possible overlapping pixel runs as used in the method of FIG. 4.

FIG. 6 is a schematic flow diagram illustrating a method for handling possible overlapping pixel runs as used in the method of FIG. 4, and depicts the process 412 in more detail. The process 412 is responsible for processing the condition where two pixel runs overlap the left and right edges EndX values.

Inputs into the process 412 are the current pixel run [left, right) at the current scanline, and the pair of left and right edges from the AEL whose EndX values are overlapping with the current pixel run. The IsLeft values of the left and right edge must be TRUE and FALSE respectively. The left and right edges were active at the previous scanline, and are still on the active edges list AEL.

The process 412 starts at a step 605. The step 605 gets the next pixel run [next_left, next_right) to be processed for the current scanline from the scan conversion result. If there are no more pixel runs to be processed, following a NO arrow 634 a step 618 is carried out, otherwise following a YES arrow 631 a step 606 is carried out.

The step 606 determines whether the pixel run [next_left, next_right) is outside the left and right edges EndX values. If next_left is greater than the right edge's EndX value, which means that the next pixel run [next_left, next_right) is not overlapping with EndX values the left and right edges in the previous scanline, then following a YES arrow 636 a step 614 is carried out, otherwise following a NO arrow 633 a step 611 is carried out.

The step 614 returns the next pixel run [next_left, next_right) to the scan conversion result so that the next pixel run available from the scan conversion result to be processed will be [next_left, next_right).

After the step 614, following an arrow 643 the step 618 is carried out to extend the left and right edges to include the current pixel run [left, right) by:
- a. Adding horizontal line segments into the left and right edges to end x-y point at (left, current scanline), and (right, current scanline) respectively; and
- b. Adding vertical line segments into the left and right edges to end x-y point at (left, current scanline+1), and (right, current scanline+1) respectively.

The step 611 finds a pair of edges from the pairs of edges in the IEL according to the following criteria:
- a. IsLeft values of the edge pair are FALSE and TRUE;
- b. The edge pair EndX values is overlapping with the left and right edges in the x-direction; and c. The edge pair EndY values is the same and at most the predetermined number of scanline above the current pixel run scanline (MAX_JOIN_Y_LENGTH).

If the edge pair is found, a variable named first-inactive-overlapped-edge is set to be the first edge of the edge pair, and then following a YES arrow 632 a process 620 is carried out, otherwise following a NO arrow 635 a step 612 is carried out.

The process 620 processes all pixel runs at the current scanline which are overlapping with the left and right edges described hereinafter in more detail with reference to FIG. 7.

After the process 620, following an arrow 637 an END step 699 is carried out which ends the process 412.

Returning to the step 612 this step determines whether the next pixel run [next_left, next_right) is outside the left and right edges. If next_left is greater than the right edge's EndX value, which means that the next pixel run [next_left, next_right) is not overlapping with the left and right edges' EndX values, then following a YES arrow 638 the step 614 is carried out, otherwise following a NO arrow 640 a step 613 is carried out.

The step 613 determines the scanline y position at which to insert a new pair of edges. If the edge pair's left and right edges start at the same scanline and the difference between the current scanline and the start y position of the edges is less than a predefined value (MAX_JOIN_Y_LENGTH), then following a NO arrow 642 a step 616 is carried, otherwise following a YES arrow 641 a step 615 is carried out.

Typically the decision in the step 613 uses a cost function in a PSR system, the cost function being based upon a CPU processing cost for keeping a pair of edges active for the predetermined number of scanline versus a CPU processing cost for loading a new pair of edges into the active edge list in the PSR system.

After the step 615, following an arrow 644 a step 617 is carried out.

After step the 616, following an arrow 645 the step 617 is carried out.

The step 615 inserts into the AEL a pair of edges at the maximum of the StartY position named y_insert_pos of the left and right edges as follows:
  a. Extend the left edge by:
     (a) adding a horizontal line segment to end x-y point at (left, current scanline), then
     (b) adding a vertical segment to end x-y point at (left, current scanline+1);
  b. Create a new right edge starting x-y point at (left, y_insert_pos), and ending x-y point at (left, current scanline+1), and IsLeft is set to FALSE;
  c. Create a new left edge starting x-y point at (left, y_insert_pos), ending is x-y point at (left, current scanline), and IsLeft is set to TRUE;
  d. Insert the new edges into the AEL so that the AEL has the following order: the left edge, the new right edge, the new left edge, and the right edge;
  e. Set the new left edge to be the left edge; and
  f. Set the next pixel run [next_left, next_right) to be current pixel run [left, right).

The step 616 inserts into the AEL a pair of edges at the current scanline as follows:
  a. Extend the left edge by:
     (a) adding a horizontal line segment to end x-y point at (left, current scanline); then
     (b) adding a vertical segment to end x-y point at (left, current scanline+1);
  b. Create a new right edge starting x-y point at (left, current scanline), and ending x-y point at (left, current scanline+1), and IsLeft is set to FALSE;
  c. Create a new left edge starting and ending x-y point at (left, current scanline), and IsLeft is set to TRUE;
  d. Insert the new edges into the AEL so that the AEL has the following order: the left edge, the new right edge, the new left edge, and the right edge;
  e. Set the new left edge to be the left edge; and
  f. Set the next pixel run [next_left, next_right) to be current pixel run [left, right).

The operation of the step 617 is similar to that of the step 605. At the step 617, the next pixel run [next_left, next_right) of the current scanline to be processed is retrieved from the scan conversion result, and if there are no more pixel runs to be processed, following a NO arrow 646 a step 618 is carried out, otherwise following a YES arrow 639 the step 612 is carried out again.

After the step 618, following an arrow 647 the END step 699 is carried out which terminates the process 412.

Figure 7:
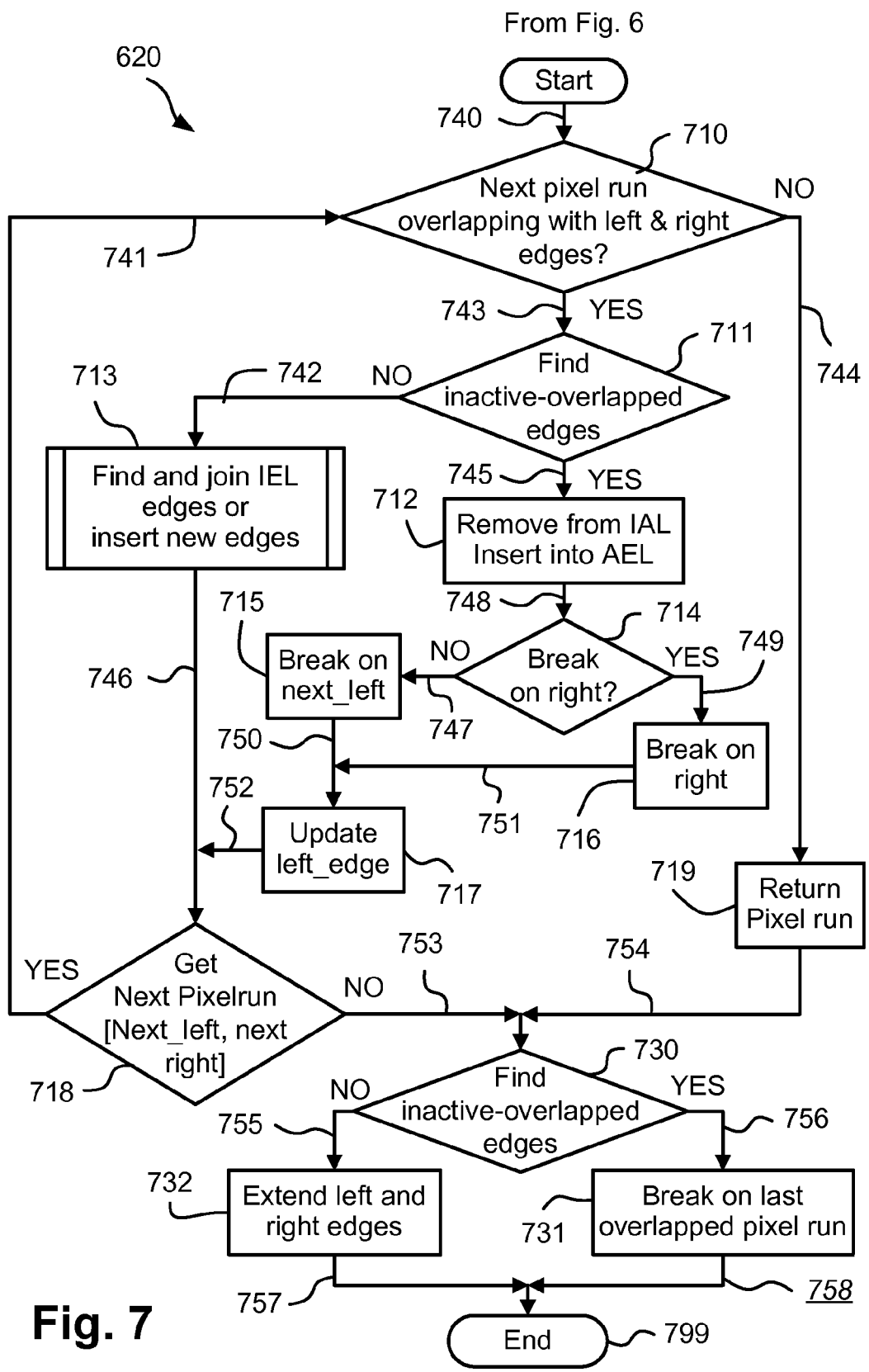
FIG. 7 is a schematic flow diagram illustrating a method for handling overlapping pixel runs as used in the method of FIG. 6.

FIG. 7 is a schematic flow diagram illustrating a method for handling overlapping pixel runs as used in the method of FIG. 6 and depicts an example of the process 620 in detail. The process 620 processes all pixel runs at the current scanline which overlap with given left and right edges EndX values. The inputs into process 620 are as follows:
  a. The current pixel run [left, right) at the current scanline;
  b. The next pixel run [next_left, next right] at the current scanline after the current pixel run;
  c. The active edges left_edge and right_edge which EndX values overlap with both the current pixel run and the next pixel run; and
  d. The first-inactive-overlapped-edge which is the first edge of an edge pair in the IEL which the edge pair EndX values overlap with the active edges left_edge, right_edge EndX values.

The process 620 starts at a step 710. The step 710 determines whether the next pixel run [next_left, next_right) overlaps with EndX values of the left and right edges in the previous scanline. If next_left is greater than the right edge's EndX value, following a NO arrow 744 a step 719 is carried out, otherwise following a YES arrow 744 a step 711 is carried out.

At the step 711, an inactive edge pair prev_left_edge, and prev_right_edge is searched for from pairs of edges in the IEL according to the following criteria:
  a. the edge pair EndX values must overlap or touch the current pixel run [left, right) or the next pixel [next_left, next_right); and
  b. the IsLeft values of prev_left_edge, and prev_right_edge must be FALSE and TRUE respectively; and
  c. the EndY values of prev_left_edge, and prev_right_edge must be the same; and
  d. the EndY values of the edge pair must be at most a predetermined number of scanline above the current scanline (MAX_JOIN_YLENGTH).

The step 711 should utilise the first-inactive-overlapped-edge as the first edge in the IEL for searching. If the edge pair prev_left_edge, and prev_right_edge is found, the first-inactive-overlapped-edge is updated to be the edge after prev_right_edge, and then following a YES arrow 745 a step 712 is carried out, otherwise following a NO arrow 742 a step 713 is carried out.

The process 713 is the same as the process 405 "find and join the IEL edge or insert new edges" which is described herein in detail in regard to FIG. 5.

After the process 713, following an arrow 746 a step 718 is carried out. The step 718 gets the next pixel run [next_left, next_right) to be processed for the current scanline from the scan conversion result, and if there are no more pixel runs to be processed, following a NO arrow 753 a step 730 is carried out, otherwise following a YES arrow 740 the step 710 is carried out.

The step 712 removes the edge pair prev_left_edge, and prev_right_edge from the IEL, and then inserts the edge pair prev_left_edge, and prev_right_edge into the AEL so that the edges in the AEL have the following order: the left edge, the prev_left_edge edge, the prev_right_edge edge, the right edge.

After the step 712, following an arrow 748 a step 714 is carried out. The Step 714 determines the x position at which to split the active pixels bounded by the left and right edges vertically. The x position of the vertical breaking line typically can be any x value within the left and right edges' EndX values, this being referred to as the range of the noted left and right edges. To minimise the number of lines segments for joining, the x position is chosen to be either next_left, being the left side of the next pixel run [next_left, next_right), or 'right', being the right side of the current pixel run [left, right). If the EndX of the prev_right_edge is greater than the current pixel run right value, or the EndX of the prev_left_edge edge is less than the current pixel run right value, then following a YES arrow 749 a step 716 is carried out, otherwise following a NO arrow 747 a step 715 is carried out.

The step 715 designated "break on next_left" is carried out as follows:
a. Extend the left edge by:
  (a) adding a horizontal line segment to end x-y point at (left, current scanline); then
  (b) adding a 1 scanline vertical segment to end x-y point at (left, current scanline+1).
b. Extend prev_left_edge edge by:
  (a) Adding a horizontal line segment to end x-y point at (next_left, prev_left_edge.EndY); then
  (b) adding a vertical line segment to end x-y point at (next_left, current scanline); then
  (c) adding a horizontal line segment to end x-y point at (right, current scanline); then
  (d) adding a vertical line segment to end x-y point at (right, current scanline+1).
c. Extend prev_right_edge by:
  (a) Adding a horizontal line segment to end x-y point at (next_left, prev_right_edge.EndY); then
  (b) adding a vertical segment to end x-y point at (next_left, current scanline).

After the step 715, following an arrow 750 a step 717 is carried out.

Returning to the step 716 which is designated "break on right" the step is carried out as follow:
a. Extend the left edge by:
  (a) Adding a horizontal line segment to end x-y point at (left, current scanline); then
  (b) adding a 1 scanline vertical segment to end x-y point at (left, current scanline+1).
b. Extend prev_left_edge edge by:
  (a) inserting a horizontal line segment to end x-y point at (right, prev_left_edge.EndY); then
  (b) adding a vertical line segment to end x-y point at (right, current scanline+1).

c. Extend prev_right_edge edge by:
  (a) Adding a horizontal line segment to end x-y point at (right, prev_right_edge.EndY); then
  (b) adding a vertical segment to end x-y point at (right, current scanline).

After the step 716, following an arrow 751 a step 717 is carried out.

The step 717 sets the left edge to be prev_right_edge, then set the current pixel run [left, right) to be the next pixel run [next_left, next_right).

After the step 717, following an arrow 752 a step 718 is carried out.

Returning to the step 719, this step is similar to the step 614 in FIG. 6. The step 719 returns the pixel run [next_left, next_right) to the scan conversion result so that the next pixel run available to be processed from current line will be [next_left, next_right).

After step 719, following an arrow 754 a step 730 is carried out.

The step 730 is similar to the step 711.

At the step 730, an inactive edge pair prev_left_edge, and prev_right_edge is searched from pairs of edges in the IEL according to the following criteria:
a. the edge pair EndX values must overlap or touch the current pixel run [left, right); and
b. IsLeft values of prev_left_edge, and prev_right_edge must be FALSE and TRUE respectively; and
c. EndY values of prev_left_edge, and prev_right_edge must be the same; and
d. EndY values of the edge pair must be at most a predetermined number of scanlines above the current scanline (MAX_JOIN_YLENGTH).

The step 730 should utilise the first-inactive-overlapped-edge as the first edge in the IEL for searching. If the edge pair prev_left_edge, and prev_right_edge is found, the first-inactive-overlapped-edge is updated to be the edge after prev_right_edge, and then following a YES arrow 756 a step 731 is carried out, otherwise following a NO arrow 755 a step 732 is carried out.

In the step 731, the current pixel run is the last pixel run which overlaps with both EndX values of the left and the right edges, and EndX values of the edge pair prev_left_edge and prev_right_edge, are divided into 2 partitions as follow:
a. Remove the inactive edge pair prev_left_edge, and prev_right_edge from the IEL; and
b. Remove the left edge from AEL; and
c. Extend prev_left_edge by:
  (a) adding a horizontal line segment to end x-y point at (left, prev_left_edge.EndY); then
  (b) adding a vertical segment to end x-y point at (left, current scanline).
d. Add the left edge and prev_left_edge to the end of TIEL;
e. Extend prev_right_edge edge by:
  (a) adding a horizontal line segment to end x-y point at (left, prev_left_edge.EndY); then
  (b) adding a vertical line segment to end x-y point at (left, current scanline+1).
f. Extend the right edge by:
  (a) adding a horizontal line segment to end x-y point at (right, current scanline); then
  (b) adding a vertical segment to end x-y point at (right, current scanline+1). and
g. Insert prev_right_edge to the AEL before the right edge.

The step 732 is similar to the step 618. The step 732 extends the left and right edges to include the pixel run [left, right) by performing the following:
   a. Extend the left edge by:
      (a) adding a horizontal line segment to end x-y point at (left, current scanline); then
      (b) adding a vertical segment to end x-y point at (left, current scanline+1);
   b. Extend the right edge by:
      (a) adding a horizontal line segment to end x-y point at (right, current scanline); then
      (b) adding a vertical segment to end x-y point at (right, current scanline+1).

After the step 731, following an arrow 758 an END step 799 is carried out which ends the process 620.

After the step 732, following an arrow 757 the step 799 is carried out which ends process 620.

Figure 11A:
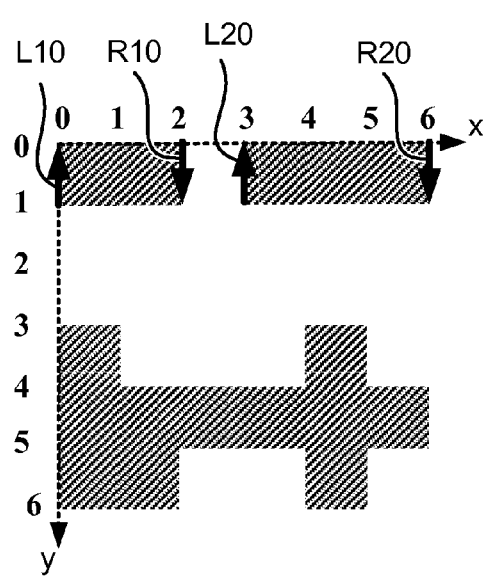
FIG. 11A is a diagram illustrating an example of a pattern for joining & splitting pixel runs in which the first scanline data has been processed by the method of FIG. 3.

FIG. 11A is a diagram illustrating an example of a pattern for joining & splitting pixel runs in which the first scanline data has been processed by the method of FIG. 3, and shows an example of a pixel pattern produced by combining paths of one or more graphic objects of the same color attribute. The hatched areas are active-pixels which should be filled with the color attribute. The non-hatched-areas are background which should not be filled with the color attribute. When scanline converted, the hatch pattern in FIG. 11A should have the following pixel runs:
   a. Atscanline 0, there are two pixel runs [0, 2), and [3, 6).
   b. At scanline 3, there are two pixel runs [0, 1), and [4, 5).
   c. At scanline 4, there is one pixel run [0, 6).
   d. At scanline 5, there are two pixel runs [0, 2), and [4, 5).

Referring to FIG. 3, one or more objects of the same fill attribute which produce pixel runs in FIG. 11A are inputted into the step 310 of the process 1786. The step 310 sets up the scanline conversion for the input objects. The accumulated visual bounding box of all the input objects detected by the step 310 would have y values from scanline 0 to scanline 5 inclusively. The process 320 sets IEL and the AEL to be empty. The current scanline is also set to be scanline 0. For each scanline from 0 to 5, the step 330 and the step 340 are carried out to process all pixel runs for the scanline.

Referring to FIG. 4, the step 401 sets the currently-active-edge be the head of the AEL which is empty. TIEL is set to empty. The step 402 is carried out to get the next pixel for scanline 0 to be processed—[0, 2). The current pixel run becomes [0, 2), and then the process 403 is carried out to find a left and a right edge to join with the current pixel run. Since currently-active-edge is empty, the process 403 cannot find any left & right edges to join, and then the step 404 decides that the process 405 is to be carried out.

Referring to FIG. 5, since the IEL is empty, the step 510 of the process 405 will not find any overlapping edge pairs in the IEL, and hence the step 520 decides that the step 530 is to be carried out to create a new pair of edges named L10, and R10 as shown in FIG. 11A, where.
   a. The edge L10 starts x-y point at (0, 0), and end at (0, 1) which has IsLeft set to TRUE; and
   b. The edge R10 starts x-y point at (2, 0), and ends at (2, 1) which has IsLeft set to FALSE.

After the step 530, the process 405 ends. Referring to FIG. 4, the step 402 is carried out to get the next pixel to be processed. The current pixel run becomes [3, 6), and hence the process 403 is carried out to find a left and a right edge to join with the current pixel run.

Since the currently-active-edge is empty, the process 403 cannot find any left & right edges to join, and then the process 405 is carried out.

Referring to FIG. 5, since the IEL is empty, the step 510 of the process 405 will not find any overlapping edge pairs in the IEL, and hence the step 520 decides that the step 530 is to be carried out to create a new pair of edges named L20, and R20 as shown in FIG. 11A as follows:
   a. The edge L20 starts x-y point at (3, 0), and ends at (3, 1) which has IsLeft set to TRUE; and
   b. The edge L20 starts x-y point at (6, 0), and ends at (6, 1) which has IsLeft set to FALSE.

After the step 530, the process 405 ends. Now referring to FIG. 4, the step 402 is carried out to get the next pixel for scanline zero to be processed. Since there is only 2 pixel runs inscanline 0, there are no more pixel runs for this scanline, then the step 408 is carried out.

Since there are no inactive edges from processing scanline 0, the step 408 does nothing, and then the step 499 is carried out which ends the process 340. At this point AEL has 4 edges in the following order: L10, R10, L20, and R20 as shown in FIG. 11A

Referring to FIG. 3, the step 330 and the process 340 are carried out for the current scanline 1 which has no pixel run. Referring to FIG. 4, the process 340 starts at the step 401 setting up the currently-active-edge to be the first edge in the AEL which is the edge L10, and TIEL is set to empty. Then the step 402 is carried out to get the next pixel to be processed for the current scanline, since there is no pixel run for the current scanline, the step 408 is carried out. In the step 408, the edges from the currently-active-edge to the end of the AEL which contains L10, R10, L20, and R20 are moved to the TIEL. All the edges in the TIEL are appended to the front of the IEL. Then the step 499 is carried out which the process 340 ends.

Referring to FIG. 3, the step 330 and the process 340 are carried out for the current scanline 2 which has no pixel run. Referring to FIG. 4, the process 340 starts at the step 401 setting up the currently-active-edge to be the first edge in the AEL which is empty and TIEL is set to empty. Then the step 402 is carried out to get the next pixel to be processed for the current scanline, and since there is no pixel run for the current scanline, the step 408 is carried out. Since none of the active edges become inactive for the current scanline, neither AEL nor IEL is changed. Then the step 499 is carried out with which process 340 ends.

It is noted that after scanline 1 is processed, there are 4 inactive edges in the IEL in the following order: L10, R10, L20, and R20 as shown in FIG. 11A

Referring to FIG. 3, the step 330 and the process 340 are carried out for the current scanline 3 which has two pixel runs [0, 1), and [4, 5). Referring to FIG. 4, the process 340 starts at the step 401 setting up the currently-active-edge to be the first edge in the AEL which is empty, and TIEL is set to empty. Then the step 402 is carried out to get the next pixel to be processed. The current pixel run becomes [0, 1). Then the process 403 is carried out to find a left and a right edge to join with the current pixel run. Since currently-active-edge is empty, the process 403 fails, and then the step 404 decides that the process 405 is to be carried out.

Figure 11B:
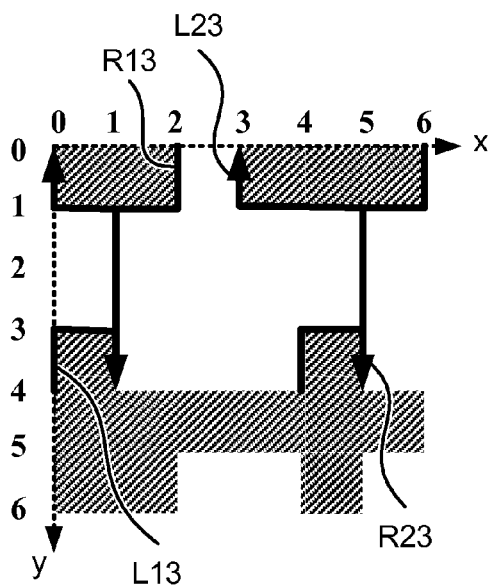
FIG. 11B is a diagram illustrating an example of a pattern for joining & splitting pixel runs which the $3^{rd}$ scanline data has been processed by the method of FIG. 3.

FIG. 11B is a diagram illustrating an example of a pattern for joining & splitting pixel runs which the 4th scanline (scanline 3) data has been processed by the method of FIG. 3. Referring to FIG. 5, the process 405 starts with the step 510. The first edge pair L10l and R10 have EndX values of [0, 2) which overlap with the current pixel run [0, 1), and meet the search criteria, therefore the step 520 decides that the step 540 is to be carried out. In the step 540, the edges L10l and R10 are removed from the IEL. Then the step 550 is carried out to generate joined line segments for edges L10, and R10. The edge L10 becomes edge L13 as shown in FIG. 11B which has the following x-y points (0,0), (0,1), (1,1), (1,3), (0,3), and (0, 4). Similarly, the edge R10 becomes edge R13 as shown in FIG. 11B which has the following x-y points (2,0), (2,1), (1,1), and (1,4).

After the step 550, the step 560 is carried out where the edges L13 and R13 are inserted into the AEL before the currently-active-edge. Then the step 599 is carried out with which process 405 end.

At this point, the IEL has 2 edges L20 and R20, the AEL has 2 edges L13 and R13, and the currently-active-edge is at the end of the AEL (empty).

Referring to FIG. 4, after the process 405, the step 402 is carried out again to get the next pixel to be processed, this being [4,5). The current pixel run becomes [4, 5) in the scanline 3. Then the process 403 is carried out to find a left edge and a right edge to join with the current pixel run [4, 5). Since the currently-active-edge is empty, the process 403 fails, and then the step 404 decides that the process 405 is to be carried out.

Referring to FIG. 5, the process 405 starts with the step 510. The first edge pair L20 and R20 have EndX values of [3, 6) which is overlapping with the current pixel run [4, 5), and meets the search criteria. Therefore the step 520 decides that the step 540 to be carried out. In the step 540, the edges L20 and R20 are removed from the IEL. Then the step 550 is carried out to generate the joined line segments for edges L20, and R20. The edge L20 becomes edge L23 as shown in FIG. 11B which has the following x-y points (3,0), (3,1), (5,1), (5,3), (4,3), and (4, 4). Similarly, the edge R20 becomes edge R23 as shown in FIG. 11B which has the following x-y points (6,0), (6,1), (5,1), and (5,4).

After the step 550, the step 560 is carried out and the edges L23 and R23 are inserted into the AEL before the currently-active-edge. Then the step 599 is carried out with which the process 405 ends.

At this point, the IEL is empty, and the AEL has 4 edges, namely L13, R13, L23, and R23, and the currently-active-edge is at the end of the AEL (empty).

Referring to FIG. 4, after the process 405, the step 402 is carried out again to get the next pixel to be processed for the current scanline. There are no more pixel runs for the current scanline, and hence the step 408 is carried out.

In the step 408, since no edges become inactive, there is no change in either AEL, or IEL, and then the step 499 is carried out with which the process 340 ends.

Referring to FIG. 3, the step 330 and the process 340 are carried out for the current scanline 4 which has one pixel run [0, 6). Referring to FIG. 4, the process 340 starts at the step 401 setting up the currently-active-edge to be the first edge in the AEL which is edge L13, and TIEL is set to empty. Then the step 402 is carried out to get the next pixel to be processed. The current pixel run becomes [0, 6). Then the process 403 is carried out to find a left edge and a right edge to join with the current pixel run.

It is noted that the currently-active-edge is L13, and there are 4 edges in the AEL which are in the following order: L13, R13, L23, and R23.

Referring to FIG. 9, the process 403 start at the step 910. The first edge pair from the currently-active-edge is L13 and R13 EndX values should be 0, and 1 which overlaps with the current pixel run [0, 6), and hence the output for the process 403 left edge is L13.

After the step 910, the step 920 decides that the step 930 is to be carried out to find the right edge of the last pair of edges overlapped with the current pixel run [0, 6). The edges L23, and R23 EndX values are 4, 5 which overlap with the current pixel run [0, 6). Hence the output for the process 403 right_edge is R23.

Also in the step 930, the edges between the left_edge L13 and the right_edge R23 R13, and L23 become inactive, and are thus moved to the TIEL. The currently-active-edge is advanced to the edge after the right_edge R23 which is the end of the AEL (empty). After the step 930, the step 999 is carried out with which the process 403 ends.

Returning to FIG. 4, after the process 403 executed, the left_edge is L13, the right edge is R23, and the currently-active-edge is at the end of the AEL, and TIEL has R13 and L23.

After the process 403, the step 404 decides that the step 410 is to be carried out. The step 410 determines whether the right value of the current pixel run [0, 6) is inside the left (L13) and right (R23) edges' EndX values [0, 5). Since 6 which is the right value of the current pixel run [0, 6) is outside [0, 5), the step 411 is carried out.

Figure 11D:
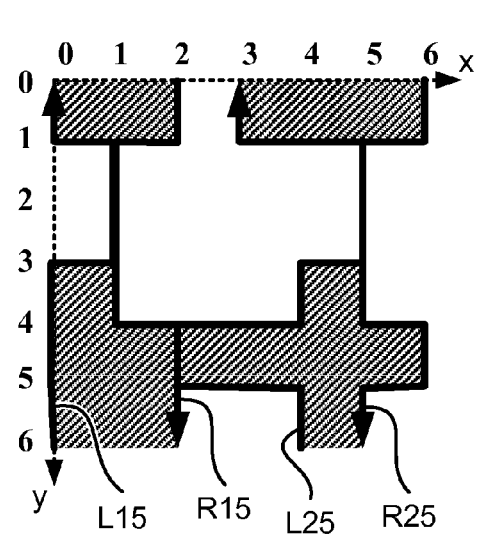
FIG. 11D is a diagram illustrating an example of a pattern for joining & splitting pixel runs which the $5^{th}$ scanline data has been processed by the method of FIG. 3.
Figure 11C:
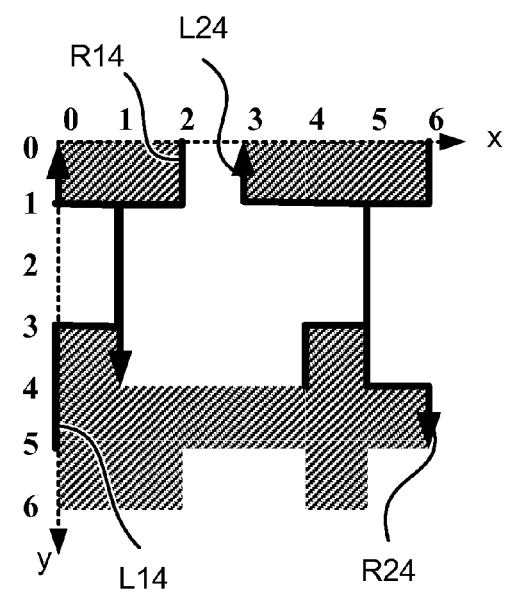
FIG. 11C is a diagram illustrating an example of a pattern for joining & splitting pixel runs which the $4^{th}$ scanline data has been processed by the method of FIG. 3.

FIG. 11C is a diagram illustrating an example of a pattern for joining & splitting pixel runs which the 5th scanline data has been processed by the method of FIG. 3. The step 411 in FIG. 4 extends the left_edge L13 and the right edges R23 to include the current pixel run [0, 6). The edge L13 becomes edge L14 as shown in FIG. 11C which has the following x-y points (0,0), (0,1), (1,1), (1,3), (0,3), and (0, 5). Similarly, the edge R23 becomes edge R24 as shown in FIG. 11C which has the following x-y points (6,0), (6,1), (5,1), (5,4), (6,4), and (6,5).

After the step 411, the step 402 is carried out to get the next pixel to be processed for the current scanline. Since there are no more pixel runs for the current scanline the step 408 is carried out.

In FIG. 11C, the 2 edges R14 and L24 are the same as edge R13, and L23 in FIG. 11B.

At the step 408, the currently-active-edge is empty, and the TIEL has 2 edges R14, and L24 which are appended to the front of the IEL. After the step 408, the step 499 is carried out with which process 340 ends.

At this point, the IEL has 2 edges R14 and L24, and the AEL has 2 edges L14 and R24.

Referring to FIG. 3, the step 330 and the process 340 are carried out for the current scanline 5 which has two pixel runs [0, 2), and [4, 5). Referring to FIG. 4, the process 340 starts at the step 401 setting up the currently-active-edge to be the first edge in the AEL which is edge L14, and TIEL is set to empty. Then the step 402 is carried out to get the next pixel to be processed. The current pixel run becomes [0, 2). Then the process 403 is carried out to find a left and a right edge to join with the current pixel run.

Referring to FIG. 9, the process 403 starts at the step 910. The first edge pair from currently-active-edge is L14 and R14 EndX values are 0 and 6 which overlap with the current pixel run [0, 2), hence the output for the process 403 left edge is L14.

After the step 910, the step 920 decides that the step 930 is to be carried out to find the right edge of the last pair of edges in the AEL that overlap with the current pixel run. Since there is only one edge pair in the AEL, the last edge pair must be the same as the first edge pair and hence the output right_edge of the process 403 should be edge R24.

Also in the step 930, there is no edge between edges L14, and R24, and hence no edges are moved to the TIEL. The currently-active-edge is advanced to be after the right edge which is at the end of the AEL (or empty). After the step 930, the step 999 is carried out with which the process 403 ends.

Returning to FIG. 4, after the process 403, the step 404 decides that the step 410 is to be carried out. The step 410 determines whether the right value of the current pixel run [0, 2) is inside the left (L14) and right (R24) edges' EndX values [0, 6). Since 2 which is the right value of the current pixel run [0, 2) is inside [0, 6), there are possible pixel runs after the current pixel run overlapping with the left and right edges EndXs values, and thus the process 412 is carried out.

Referring to FIG. 6, the process 412 starts with the step 605 which is carried out to get the next pixel run to be processed. The next pixel run [next_left, next_right) becomes [4, 5). Then the step 606 is carried out which determines whether the next pixel run [4, 5) is outside the left and right edge EndX values [0, 6). In this case [4, 5) is inside [0, 6), and hence the step 611 is carried out to find overlapping inactive edges pair.

In the step 611, the IEL has 2 edges R14, and L24 whose IsLeft values are FALSE and TRUE respectively. The EndXs values of the two edges are [1,4) which overlap with the left and right edges EndX value [0, 6). Hence the first-inactive-overlapped-edge is set to be R14, and then the process 620 is carried out.

Referring to FIG. 7, the process 620 starts at the step 710. Since the next pixel run [4, 5) overlaps with the left and right edge EndX values [0, 6), the step 711 is carried out.

At the step 711, the only edge pair R14 and L24 in the IEL meet all the searching criteria for the step 711. The edge pair overlaps with the current pixel run [0, 2), and hence prev_left_edge, and prev_right_edge are set to be edge R14, and edge L24. Also the first-inactive-overlapped-edge is advanced to be the edge after and prev_right_edge which is the end of the IEL (empty). Then the step 712 is carried out.

The step 712 removes the edges 14, and L24 from the IEL and inserts them into the AEL so that the AEL has the following order: L14, R14, L24, and R24. Then the step 714 is carried out.

The step 714 determines the location at which to split the active pixels bound by the left and right edges vertically. In this case, it is chosen to break the pixel bound at the current pixel run right value (x=2), and then the step 715 is carried out.

FIG. 11D is a diagram illustrating an example of a pattern for joining & splitting pixel runs which the 6th scanline data has been processed by the method of FIG. 3. In the step 715 in FIG. 7, the left edge L14, prev_left_edge R14, and prev_right_edge L24 are extended as follows:

a. the left edge L14 becomes edge L15 as shown in FIG. 11D which has the following x-y points (0,0), (0,1), (1,1), (1,3), (0,3); and (0, 6);

b. the prev_left_edge R14 becomes edge R15 as shown in FIG. 11D which has the following x-y points (2,0), (2,1), (1,1), (1,4), (2,4), and (2,6); and c. the prev_right_edge L24 has the following x-y points (3,0), (3,1), (5,1), (5,3), (4,3), (4,4), (2,4), and (2,5).

After the step 715, the step 717 sets the left edge to be prev_right_edge L24, and the current pixel run is set to be the next pixel run [4,5].

At this point the left_edge and right_edge are L24 and R24.

After the step 717, the step 718 is carried out to get the next pixel run [next_left, next_right) to be processed for the current scanline. Since there are no more pixel runs, the step 730 is carried out.

In the step 730, since the first-inactive-overlapped-edge has become empty in the step 711, the step 732 is carried out.

The step 731 extends the left and right edges to include the current pixel run [4, 5) as follows:

a. The left edge L24 becomes the edge L25 as shown in FIG. 11D which has the following x-y points (3,0), (3,1), (5,1), (5,3), (4,3), (4,4), (2,4), (2,5), (4,5), and (4, 6); and b. The right edge R24 becomes the edge R25 as shown in FIG. 11D which has the following x-y points (6,0), (6,1), (5,1), (5,4), (6,4), (6,5), (5,5), and (5, 6).

After the step 732, the step 799 is carried out with which the process 620 ends.

Returning to FIG. 6, after the process 620, the step 699 is carried out which ends the process 412.

Returning to FIG. 4, after the process 412, the step 402 is carried out to get the next pixel run for the current scanline. Since there are no more pixel runs, the step 408 is carried out.

In the step 408, since there are no edges in the TIEL and the currently-active-edge is empty, there is no change in the AEL and the IEL. Then the step 499 is carried out with which the process 340 ends.

At this point, the IEL is empty, and the AEL has 4 edges L15, R15, L25, and R25.

Returning to FIG. 3, since there are no more scanlines to process, the process 350 is carried out by which edges in the AEL are moved to the IEL, and then the tracing output is generated from edges in the IEL, and then the step 399 is carried out with which the process 1786 ends.

FIG. 13 is an illustration of a graphic object and various elements thereof together with their associated terminology. Depicted is the graphic object 1801 that can be made up of a number of distinct graphic objects (not shown) having the same colour attribute. The object 1801 has the associated directed fill path 1802, the directed nature of the path being indicated by various arrows along the length of the path, all the arrows pointing, in the example shown, in a clockwise direction. A number of scanlines 1803, 1804, 1817, and 1818 are depicted. The scanline 1803 has the edge pair 1805, 1806, the pixel run 1809 defined by the respective scanline coordinates 1807, 1808, and the pixel run 1809 has the associated range 1823. The edge pair 1805, 1806 is extended by respective dx components 1821, 1813 and joined to respective edges 1811, 1812 to form new edges according to the EE arrangement.

FIGS. 14A and 14B illustrate examples of graphic objects and how the EE arrangement is used to generate new edge pairs.

INDUSTRIAL APPLICABILITY

The arrangements described are applicable to the computer and data processing industries and particularly for the printing and display industry segments.

The foregoing describes only some embodiments of the present invention, and modifications and/or changes can be made thereto without departing from the scope and spirit of the invention, the embodiments being illustrative and not restrictive.

The invention claimed is:

1. A method of rendering at least one graphical object comprising a plurality of sub parts described with a page description language format, said method comprising the steps of:

converting the at least one graphical object described with the page description language format into a set of edges associated with a common color attribute, the set of edges comprising at least a first edge pair and a second edge pair;

detecting an edge of the second edge pair which is in an extended vertical line of a current edge from a first edge pair converted in the converting step, wherein the first edge pair and the second edge pair are vertically separated by a scanline gap precluding the second edge pair from continuing towards the first edge pair;

joining the detected edge and the current edge to make a new edge pair passing through the scanline gap, the new edge pair having an empty fill portion in the scanline gap between the detected edge and the current edge; and processing the new edge pair to render the at least one graphical object.

2. The method according to claim 1, wherein detecting an edge of the second edge pair which is in an extended vertical line of the current edge further comprising: searching a list of edges inactive on the current scanline to detect the edge of the second pair which is in an extended vertical line of the current edge.

3. The method according to claim 2, wherein joining comprises:

activating the second edge if the second edge is in an extended vertical line of the current edge.

4. A method of rendering at least one graphical object comprising a plurality of sub parts described with a page description language format, said method comprising the steps of:

converting the at least one graphical object into a first edge pair and a second edge pair, wherein the first edge pair and the second edge pair are associated with a common color attribute and are vertically separated by a scanline gap precluding the second edge pair from continuing towards the first edge pair;

determining if a first edge of the second edge pair is vertically extendable through the scanline gap towards a first edge of the first edge pair;

determining if a second edge of the second edge pair is displaced from the first edge of the second edge pair in a same scan direction as a second edge of the first edge pair is displaced from the first edge of the first edge pair;

if the first edge of the second edge pair is vertically extendable through the scanline gap towards the first edge of the first edge pair, and the second edge of the second edge pair is displaced from the first edge of the second edge pair in the same scan direction as the second edge of the first edge pair is displaced from the first edge of the first edge pair, joining the second edge pair and the first edge pair to make a corresponding new edge pair having an empty fill portion in the scanline gap; and processing the new edge pair to render the at least one graphical object.

5. A method according to claim 4, wherein the joining step comprises the steps of:

inserting, between the second edge pair and the first edge pair, horizontal edges and scanline gap line segments to ensure that:

edges of the new edge pair are monotonic and continuous over the vertical scanline span covering the first edge pair and the second edge pair; and the scanline gap segments are coincident in the scanline gap, thereby forming the empty fill portion in the scanline gap.

6. A method according to claim 5, wherein the scanline gap segments are either vertical or diagonal.

7. The method according to claim 4, wherein the second edge pair is selected from a plurality of edges inactive on the current scanline.

8. The method according to claim 7, wherein joining comprises: activating the second edge pair if the first edge of the second edge pair can be vertically extended through the scanline gap towards the first edge of the first edge pair, and the second edge of the second edge pair is displaced from the first edge of the second edge pair in the same scan direction as the second edge of the first edge pair is displaced from the first edge of the first edge pair.

9. A method of rendering at least one graphical object comprising a plurality of sub parts described with a page description language format, said method comprising the steps of:

converting the at least one graphical object into a first edge pair and a second edge pair, wherein the first edge pair and the second edge pair are associated with a common color attribute and are vertically separated by a scanline gap;

joining the second edge pair and the first edge pair to make a corresponding new edge pair passing through the scanline gap and having an empty fill portion in the scanline gap, wherein the scanline gap precludes the second edge pair from continuing towards the first edge pair; and processing the new edge pair to render the at least one graphical object.

10. The method according to claim 9, wherein the second edge pair is selected from a plurality of edges inactive on the current scanline.

11. A method of rendering at least one graphical object described with a page description language, said method comprising the steps of:

converting the at least one graphical object described with a page description language format into a set of edges associated with a common color attribute;

detecting, from the set of edges associated with the common color attribute, a plurality of pixel runs on a previous scanline and a plurality of pixel runs on a subsequent scan line, in a range of a pixel run on a current scanline; and splitting the pixel run on the current scanline into a plurality of portions associated with the common color attributed based on the plurality of pixel runs on the previous scanline and the plurality of pixel runs the subsequent scanline,:

forming closed paths each of which comprises a portion of the pixel run on the current scanline, one of the plurality of pixel runs of the previous scanline, and one of the plurality of pixel runs of the subsequent scanline, wherein the one of the plurality of pixel runs on the previous scanline, and one of the plurality of pixel runs on the subsequent scanline are adjacent to the portion of the pixel run on the current scanline; and processing edges of the formed closed path to render the at least one graphical object.

12. The method according to claim 11, wherein the plurality of pixel runs on the previous scanline is determined by searching a plurality of edges inactive on the current scanline.

13. An apparatus for rendering at least one graphical object comprising a plurality of sub parts described with a page description language format, said apparatus comprising:
- a processor; and
- a non-transitory memory storing a computer executable program for directing the processor to perform the steps of:
  - converting the at least one graphical object into a first edge pair and a second edge pair, wherein the first edge pair and the second edge pair are associated with a common color attribute and are vertically separated by a scanline gap precluding the second edge pair from continuing towards the first edge pair;
  - determining if a first edge of the second edge pair is in a vertical line with a first edge of the first edge pair;
  - determining if a second edge of the second edge pair is displaced from the first edge of the second edge pair in a same scan direction as a second edge of the first edge pair is displaced from the first edge of the first edge pair;
  - if the first edge of the second edge pair is in the vertical line with the first edge of the first edge pair, and the second edge of the second edge pair is displaced from the first edge of the second edge pair in the same scan direction as the second edge of the first edge pair is displaced from the first edge of the first edge pair, joining the second edge pair and the first edge pair to make a corresponding new edge pair having an empty fill portion in the scanline gap; and processing the new edge pair to render the at least one graphical object.

14. A computer readable non-transitory storage memory medium storing a computer executable program for directing a processor to perform a method for rendering at least one graphical object comprising a plurality of sub parts described with a page description language format, said program comprising:
- computer executable code for converting the at least one graphical object into a first edge pair and a second edge pair, wherein the first edge pair and the second edge pair are associated with a common color attribute and are vertically separated by a scanline gap precluding the second edge pair from continuing towards the first edge pair;
- computer executable code for determining if a first edge of the second edge pair is in a vertical line with a first edge of the first edge pair;
- computer executable code for determining if a second edge of the second edge pair is displaced from the first edge of the second edge pair in a same scan direction as a second edge of the first edge pair is displaced from the first edge of the first edge pair; and
- computer executable code for,
  - if the first edge of the second edge pair is in the vertical line with the first edge of the first edge pair, and the second edge of the second edge pair is displaced from the first edge of the second edge pair in the same scan direction as the second edge of the first edge pair is displaced from the first edge of the first edge pair, joining the second edge pair and the first edge pair to make a corresponding new edge pair having an empty fill portion in the scanline gap; and
  - processing the new edge pair to render the at least one graphical object.

15. A method of rendering at least one graphical object described with a page description language, said method comprising the steps of:
- converting the at least one graphical object described with a page description language format into a set of edges spanning a plurality of scanlines, the edges in the set of edges being associated with a common color attribute;
- detecting, from the set of edges spanning the plurality of scanlines, a plurality of edges on a previous scanline and a plurality of edges on a subsequent scan line;
- determining, based on the plurality of edges on the previous scanline and the plurality of edges on the subsequent scanline, at least two edges passing through the current scanline and splitting at least one pixel run associated with the common color attribute on the current scanline to generate a reduced set of edges; and
- processing the reduced set of edges to render the at least one graphical object.

16. The method according to claim 15, wherein the reduced set of edges is generated by selecting the at least one edge on the previous scanline from a plurality of edges inactive of the current scanline.

* * * * *